(12) United States Patent
Matsuda

(10) Patent No.: US 9,233,672 B2
(45) Date of Patent: Jan. 12, 2016

(54) CONTROL SYSTEM IN VEHICLE AND METHOD OF CONTROLLING VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 143 days.

(21) Appl. No.: 12/976,933

(22) Filed: Dec. 22, 2010

(65) Prior Publication Data

US 2011/0160977 A1 Jun. 30, 2011

(30) Foreign Application Priority Data

Dec. 28, 2009 (JP) ................................. 2009-297979
Dec. 29, 2009 (JP) ................................. 2009-299191

(51) Int. Cl.
*B60T 8/175* (2006.01)
*G06F 19/00* (2011.01)
*B60T 8/17* (2006.01)

(52) U.S. Cl.
CPC ............... *B60T 8/175* (2013.01); *B60T 8/1706* (2013.01)

(58) Field of Classification Search
CPC .............................. B60T 8/1806; B60T 8/175
USPC ........... 701/99, 82, 70, 60, 87, 54; 123/197.3, 123/349, 406.19, 59.1
See application file for complete search history.

(56) References Cited

U.S. PATENT DOCUMENTS

| | | | | |
|---|---|---|---|---|
| 5,246,278 | A | * | 9/1993 | Yoshino et al. ............... 303/163 |
| 2005/0187695 | A1 | * | 8/2005 | Fangeat et al. .................. 701/71 |
| 2008/0319626 | A1 | * | 12/2008 | Ogawa ............................ 701/80 |
| 2009/0093927 | A1 | * | 4/2009 | Mueller-Schneiders et al. ............................... 701/36 |
| 2009/0326777 | A1 | * | 12/2009 | Oshima et al. .................. 701/83 |

FOREIGN PATENT DOCUMENTS

| | | |
|---|---|---|
| JP | 07101258 A | 4/1995 |
| JP | 7127491 A | 5/1995 |
| JP | 2008-111430 A | 5/2008 |

\* cited by examiner

*Primary Examiner* — Helal A Algahaim
*Assistant Examiner* — Charles J Han
(74) *Attorney, Agent, or Firm* — Alleman Hall McCoy Russell & Tuttle LLP

(57) ABSTRACT

A control system in a vehicle configured to rotate a drive wheel by a driving power generated in a driving power source mounted in the vehicle; comprises a slip value measuring unit configured to measure a slip value indicating a degree to which the drive wheel spins; a change rate calculator configured to calculate a change rate of the slip value measured by the slip value measuring unit; and a road surface condition determiner configured to determine a road surface condition according to the change rate of the slip value calculated by the change rate calculator.

9 Claims, 13 Drawing Sheets

| ROAD SURFACE CONDITION | SLIP VALUE S | SLIP VALUE CHANGE RATE ΔS |
|---|---|---|
| ROAD SURFACE CONDITION 1 (FRICTION COEFFICIENT LARGE) | 1 | 1 |
| ROAD SURFACE CONDITION 2 (FRICTION COEFFICIENT MEDIUM) | 0.2 | 10 |
| ROAD SURFACE CONDITION 3 (FRICTION COEFFICIENT SMALL) | 0.3 | 50 |
| ROAD SURFACE CONDITION 4 (FRICTION COEFFICIENT VERY SMALL) | 0.1 | 300 |

(S,ΔS:AVERAGE VALUE  AVERAGE VALUE OF ROAD SURFACE CONDITION 1 IS 1)

US 9,233,672 B2

CONTROL SYSTEM IN VEHICLE AND METHOD OF CONTROLLING VEHICLE

CROSS REFERENCE TO RELATED APPLICATION

This application claims priority to and the benefit of Japanese Patent Application No. 2009-297979 filed on Dec. 28, 2009 and Japanese Patent Application No. 2009-299191 filed on Dec. 29, 2009, the entire disclosures of which are incorporated herein by reference.

BACKGROUND OF THE INVENTION

1. Field of the Invention

The present invention relates to a control system in a vehicle configured to rotate a drive wheel by a driving power generated in a driving power source, and a method of controlling the vehicle. Particularly, the present invention relates to a system and a method for determining a condition of a road surface on which the vehicle is driving. Moreover, the present invention relates to a system and a method for evaluating a characteristic of the vehicle.

2. Description of the Related Art

In a motorcycle, an internal combustion engine is typically mounted as a driving power source. A torque generated in the internal combustion engine is transmitted to a drive wheel via a driving power transmission path and the drive wheel transmits the driving power to a road surface, thereby enabling the motorcycle to be propelled. If the driving power transmitted to the drive wheel is beyond a gripping capability of the vehicle, the drive wheel spins. The motorcycle can be propelled even under a state where the drive wheel is spinning a little. When the motorcycle is driving off-road, for example, on a road surface with a low friction coefficient, the drive wheel tends to spin significantly. If the spin of the drive wheel becomes severe, driving of the motorcycle becomes unstable. Under the circumstances, Japanese Laid-Open Patent Application Publication No. 2008-111430 discloses that a driving power transmitted to a drive wheel is reduced when a slip value indicating a degree to which the drive wheel spins is more than a predetermined value, thereby suppressing the drive wheel from spinning.

As described above, when the motorcycle is driving off-road, for example, on the road surface with a low friction coefficient, the drive wheel tends to spin to a greater degree. On the other hand, the driver could permit a little spin when the motorcycle is driving on a road surface with a high friction coefficient. There is a tendency that the driver tries to steer the motorcycle carefully to prevent the drive wheel from spinning or to suppress a degree to which the drive wheel is going to spin when driving on the road surface with a low friction coefficient. Therefore, it is difficult to determine accurately a condition of a road surface on which the motorcycle is driving, merely by referring to a slip value indicating the degree to which the drive wheel spins.

As described above, when the torque generated in the driving power source is in excess and is beyond the gripping capability of the vehicle, the drive wheel starts spinning. If both of the generated torque and the gripping capability can be detected during driving, then it is possible to determine accurately whether or not the drive wheel is spinning. However, to accurately detect the generated torque and the gripping capability during driving by calculation of numeric values, a number of parameters are required and the calculation formulas are complex. For these reasons, actually, it is very difficult to detect the generated torque and the gripping capability.

SUMMARY OF THE INVENTION

The present invention addresses the above described conditions, and an object of the present invention is to accurately determine a road surface condition. Another object of the present invention is to provide a novel configuration indicating a vehicle characteristic, and to evaluate the vehicle characteristic using this configuration.

According to an aspect of the present invention, a control system in a vehicle configured to rotate a drive wheel by a driving power generated in a driving power source mounted in the vehicle; comprises a slip value measuring unit configured to measure a slip value indicating a degree to which the drive wheel spins; a change rate calculator configured to calculate a change rate of the slip value measured by the slip value measuring unit; and a road surface condition determiner configured to determine a road surface condition according to the change rate of the slip value calculated by the change rate calculator.

Typically, as the friction coefficient of the road surface is lower, an increasing rate of the slip value and a change rate of the slip value after start of a wheel spin are higher. In accordance with the above configuration, the road surface condition can be suitably determined with reference to the change rate of the slip value having such a characteristic.

The control system may comprise a driving power request detector configured to detect a driving power increase/decrease request value indicating a request for increasing or decreasing the driving power generated in the driving power source; a slip value measuring unit configured to measure a slip value indicating a degree to which the drive wheel spins; and a memory configured to store, as a vehicle characteristic evaluation value, a relationship in driving indicating a correlation between the driving power increase/decrease request value and the slip value during driving of the vehicle.

In accordance with the above configuration, the relationship in driving between the driving power increase/decrease request value and the slip value is stored as the vehicle characteristic evaluation value in the memory. The vehicle characteristic evaluation value represents a change in the generated torque and the gripping capability absorbing the torque, with respect to the driving power increase/decrease request value, during actual driving. With reference to the vehicle characteristic evaluation value, it is possible to detect how the generated torque and the gripping capability are balanced with respect to the driving power increase/decrease request, and thus, the vehicle characteristic relating to the generated torque and the gripping capability is suitably evaluated.

The control system may comprise a driving power request detector configured to detect a driving power increase/decrease request value indicating a request for increasing or decreasing the driving power generated in the driving power source; a slip value measuring unit configured to measure a slip value indicating a degree to which the drive wheel spins; and a controller configured to derive as a vehicle characteristic evaluation value, a relationship in driving indicating a correlation between the driving power increase/decrease request value and the slip value during driving, and control the vehicle based on the vehicle characteristic evaluation value.

In accordance with this configuration, the vehicle can be controlled suitably in view of the generated torque and the gripping capability, based on the vehicle characteristic evaluation value indicating how the generated torque and the gripping capability are balanced with respect to the driving power increase/decrease request.

According to another aspect of the present invention, a method of controlling a vehicle configured to rotate a drive wheel by a driving power generated in a driving power source mounted in the vehicle, comprises the steps of: measuring a slip value indicating a degree to which the drive wheel spins; calculating a change rate of the slip value measured in the step of measuring the slip value; and determining a road surface condition based on the change rate of the slip value calculated in the step of calculating the change rate; and controlling the vehicle based on the road surface condition determined in the step of determining the road surface condition.

According to a further aspect of the present invention, a method of controlling a straddle-type vehicle configured to rotate a drive wheel by a driving power generated in a driving power source mounted in the vehicle, comprises the steps of: detecting a driving power increase/decrease request value indicating a request for increasing or decreasing the driving power of the driving power source in the straddle-type vehicle during driving and detecting a slip value indicating a degree to which the rear wheel spins; deriving as a vehicle characteristic evaluation value a relationship in driving indicating a correlation between the driving power increase/decrease request value and the slip value; and evaluating a characteristic of the straddle-type vehicle based on the vehicle characteristic evaluation value derived in the step of deriving the evaluation value.

According to a further aspect of the present invention, a method of controlling a bankable vehicle configured to rotate a drive wheel by a driving power generated in a driving power source mounted in the vehicle, comprises the steps of detecting a bank angle of the bankable vehicle during driving and detecting a slip value indicating a degree to which the rear wheel spins; deriving as a vehicle characteristic evaluation value, a relationship in driving indicating a correlation between the bank angle and the slip value; and evaluating a characteristic of the bankable vehicle based on the vehicle characteristic evaluation value derived in the step of deriving the evaluation value.

The above and further objects, features and advantages of the present invention will more fully be apparent from the following detailed description of preferred embodiments with accompanying drawings.

DETAILED DESCRIPTION OF THE PREFERRED EMBODIMENTS

Hereinafter, embodiments of the present invention will be described with reference to the drawings. A motorcycle will be descried as an example of a vehicle using a control system and a control method of the present invention, in particular, a straddle-type vehicle or a bankable vehicle. The stated directions are referenced from the perspective of a driver straddling the motorcycle unless otherwise explicitly noted.

Embodiment 1

Motorcycle

Figure 1:
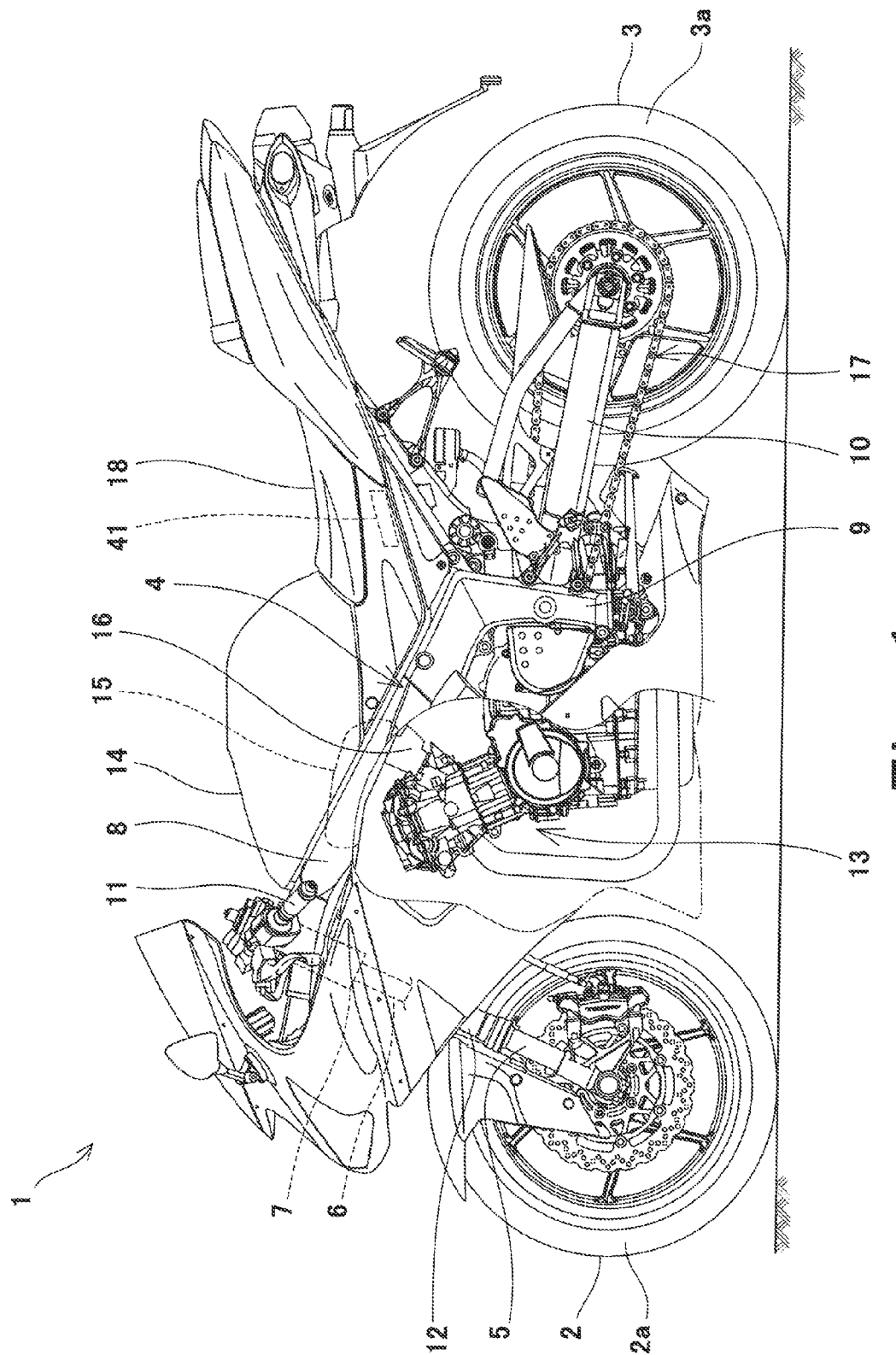
FIG. 1 is a left side view of a motorcycle which is an exemplary vehicle according to Embodiment 1 of the present invention.

FIG. 1 is a left side view of a motorcycle 1 which is an exemplary vehicle according to Embodiment 1 of the present invention. Referring to FIG. 1, the motorcycle 1 includes a front wheel 2 which is a driven wheel at a front and a rear wheel 3 which is a drive wheel at a rear. The front wheel 2 and the rear wheel 3 are rotatably mounted to a vehicle body 4. The front wheel 2 and the rear wheel 3 are attached with rubber-made tires 2a and 3a, respectively. The front wheel 2 and the rear wheel 3 roll on a road surface in a state where peripheral surfaces of the tires 2a and 3a are in contact with a road surface.

The vehicle body 4 includes a front fork 5, a steering shaft 6, a head pipe 7, a pair of right and left main frame members 8, a pair of right and left pivot frame members 9, and a pair of right and left swing arms 10. The front wheel 2 is rotatably mounted to a lower end portion of the front fork 5 extending substantially vertically. An upper end portion of the front fork 5 is coupled to a lower end portion of the steering shaft 6. The steering shaft 6 is rotatably supported by the head pipe 7. An upper end portion of the steering shaft 6 is coupled to a handle 11 having a pair of right and left grip members. When the handle 11 is rotated, the front wheel 2 turns around the steering shaft 6. The head pipe 7 is coupled to the right and left main frame members 8 extending downward in a rearward direction. The main frame members 8 are coupled at their rear end portions to the pivot frame members 9, respectively. The pivot frame members 9 are pivotally attached to front end portions of the swing arms 10 extending substantially in a forward and rearward direction. The rear wheel 3 is rotatably mounted to the rear end portions of the swing arms 10.

The front fork 5 is provided with a front suspension 12. When a load is applied from a road surface to the vehicle body 4 via the front wheel 2, the front suspension 12 is contracted to absorb the load. The load transmitted from the road surface to the vehicle body 4 via the rear wheel 3 may be absorbed by a pivot operation of the swing arms 10.

The main frame members 8 and the pivot frame members 9 serve to support an engine 13 which is a driving power source of the motorcycle 1. In this embodiment, the engine 13 is a reciprocating inline four-cylinder four-stroke engine. The engine 13 uses gasoline as a fuel. The fuel to be fed to the engine 13 is stored in a fuel tank 14 provided above the main frame members 8 and behind the handle 11. Fresh air is taken into the engine 13 from outside through an air cleaner 15 and a throttle device 16, and is mixed with a fuel inside the engine 13. The engine 13 is configured to combust an air-fuel mixture to generate a torque. The torque generated in the engine 13 is transmitted to the rear wheel 3 via a driving power transmission path 17, causing the rear wheel 3 to rotate. Thus, the motorcycle 1 is able to be propelled on the road surface.

A seat 18 is provided behind the fuel tank 14. The driver and a passenger can straddle the seat 18 in front and rear positions. Below the seat 18, an electronic control unit 41 (hereinafter referred to as ECU) is accommodated. The driver straddling the seat 18 grips the grip members of the handle 11 to steer the motorcycle 11. The right grip member of the handle 11 is a throttle grip 19 (see FIG. 2). The throttle device 16 is configured to operate according to an operation position of the throttle grip 19.

Figure 2:
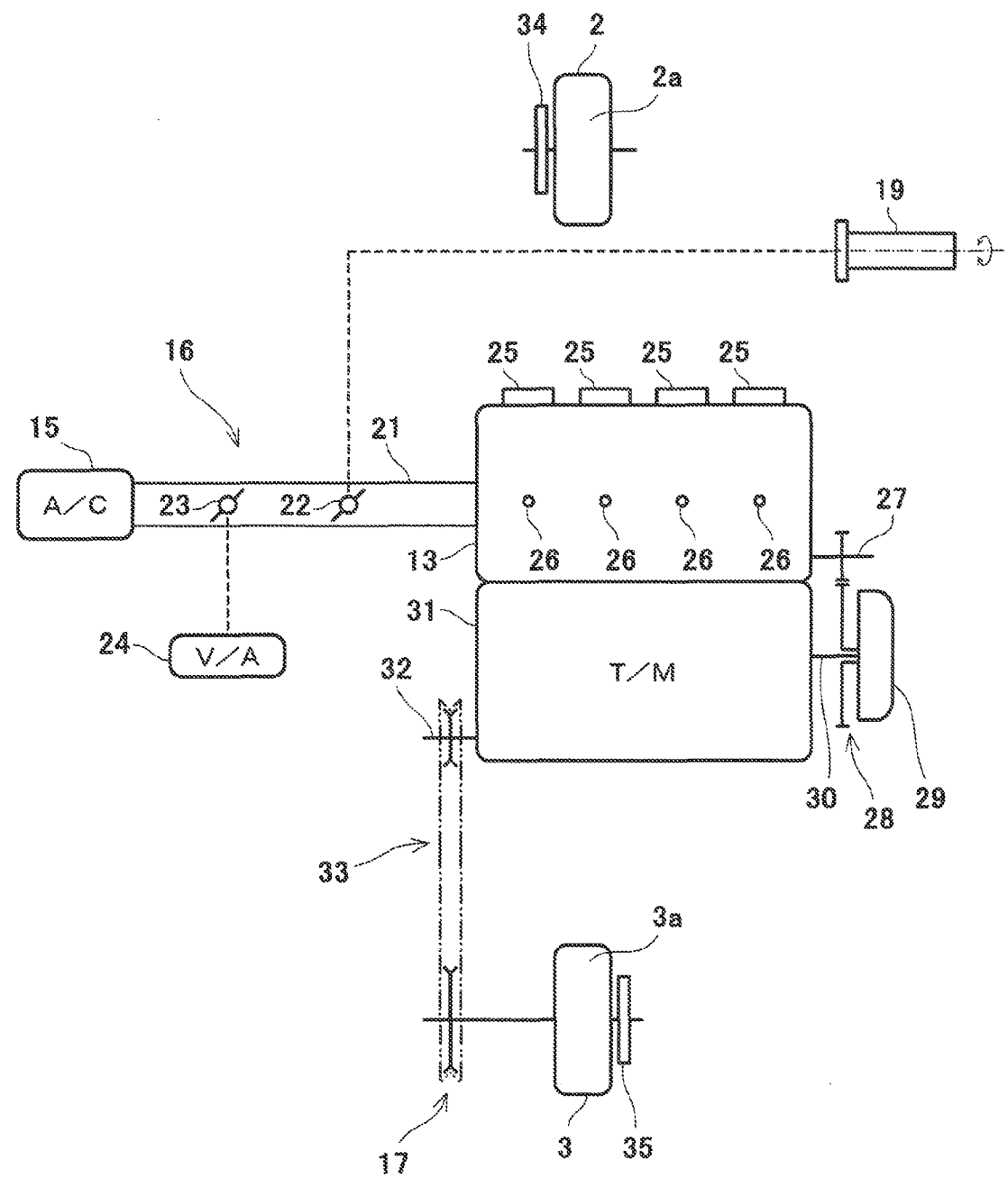
FIG. 2 is a schematic view showing a configuration of a drive system in the motorcycle of FIG. 1.

FIG. 2 is a schematic view showing a configuration of a drive system in the motorcycle 1 of FIG. 1. The throttle device 16 includes an air-intake pipe 21, a main throttle valve 22, a sub-throttle valve 23 and a valve actuator 24. The air-intake pipe 21 is coupled to the engine 13. An air-intake passage is formed inside the air-intake pipe 21. The throttle valves 22 and 23 are configured to open and close the air-intake passage such that their opening degrees are variable.

When the throttle grip 19 is rotated, the opening degree of the main throttle valve 22 is mechanically changed, so that an air-intake amount of the engine 13 increases or decreases and the torque generated in the engine 13 increases or decreases. The throttle grip 19 is a member with which the driver inputs a request for increasing or decreasing an engine driving power or a request for accelerating or decelerating the motorcycle 1. An operation position of the throttle grip 19 may be treated as a driving power increase/decrease request value indicating a request for increasing or decreasing the engine driving power. The opening degree of the main throttle valve 22 reflects the operation position of the throttle grip 19 and affects increasing or decreasing of the engine driving power. For this reason, the opening degree of the main throttle valve 22 may also be treated as the driving power increase/decrease request value. Hereinafter, the opening degree of the main throttle valve 22 is referred to as "throttle valve opening degree." The opening degree of the sub-throttle valve 23 is changed according to the operation of the valve actuator 24 so that an air-intake amount of the engine 13 is controlled regardless of the operation position of the throttle grip 19. Although the throttle device 16 includes the mechanically-driven valve and the electrically-driven valve in this embodiment, only one of them may be provided.

The engine 13 includes a fuel feeder 25 for feeding or injecting a fuel to a cylinder at suitable timings with a suitable amount, and an igniter 26 for igniting and combusting an air-fuel mixture within the cylinder at suitable timings, for each cylinder. When the air-fuel mixture is combusted inside the cylinder, the crankshaft 27 rotates according to a torque generated in the engine 13. The rotation of the crankshaft 27 is transmitted to the rear wheel 3 via the driving power transmission path 17. The driving power transmission path 17 is provided with a reduction gear mechanism 28, a clutch mechanism 29, a transmission input shaft 30, a transmission 31, a transmission output shaft 32, and a chain transmission mechanism 33. The transmission 31 is configured to set a plurality of transmission gear positions for forward driving, and the transmission gear positions correspond to different reduction gear ratios, respectively. The rotation of the transmission input shaft 30 is speed-changed in a predetermined reduction gear ratio corresponding to a transmission gear position set in the transmission 31 and transmitted to the transmission output shaft 32.

Upon the rear wheel 3 rotating, a frictional force is generated between the tire 3a of the rear wheel 3 and the road surface, the engine driving power is transmitted from the rear wheel 3 to the road surface, and the rear wheel 3 starts rolling on the road surface. Along with the rear wheel 3, the front wheel 2 contacting the road surface rolls on the road surface, and thus the motorcycle 1 is propelled on the road surface. The front wheel 2 and the rear wheel 3 are attached with a brake device 34 and a brake device 35, respectively. Each of the brake devices 34 and 35 is configured to consume the driving power for rotating the wheel 2 or 3 by friction, thereby braking the wheel 2 or 3. By the operation of the brake device 34 or 35, the driving power transmitted from the rear wheel 3 to the road surface is suppressed.

(Relationship Between Generated Torque, Gripping Capability and Slip)

In a state where there is a balance between the driving power for rotating the rear wheel 3 and the frictional force generated between the tire 3a and the road surface, the driver can steer the motorcycle 1 in a stable condition, with the rear wheel 3 gripping the road surface. The driving power transmitted from the rear wheel 3 to the road surface is according to the torque generated in the engine 13, and an operational state of the brake device 34 or 35. In a case where the torque generated in the engine 13 is in excess and the brake devices 34 and 35 are not operating, the driving power transmitted from the rear wheel 3 to the road surface exceeds the frictional force, causing the rear wheel 3 to spin.

The frictional force is determined by a load applied from the vehicle body to the road surface via the wheel and a friction coefficient between the tire and the road surface. The load applied from the vehicle body to the road surface depends on a weight of a vehicle, its gravity center position, aerodynamics (down force and drag) applied to the vehicle body, and a load absorbing capability of the suspension. The vehicle weight and the gravity center position are variable depending on a weight of loaded stuff including the driver and the passenger, a load shifting in acceleration or deceleration, etc. During turning, a centrifugal force acts on the vehicle body, and the driver of the motorcycle 1 tilts the vehicle body and changes the driver's attitude, thereby obtaining a centripetal force. A vertical component of the vehicle weight changes according to the tilting of the vehicle body and an incline of the road surface, and the aerodynamics change according to a driving wind pressure. In contrast, the friction coefficient between the tire and the road surface changes according to a specification and a use period of the tire, etc.

As should be understood, the frictional force depends on design parameters of the vehicle, the driving attitude of the vehicle, the vehicle speed, the vehicle acceleration and the tire condition. In the present specification, indices relating to the vehicle, including the tires, among indices affecting the frictional force, will be collectively referred to as the gripping capability of the vehicle. The fact that the vehicle has a high gripping capability means that a high frictional force is ensured to counter the torque generated in the engine 13, to be precise, design of the vehicle body contributes to ensuring of the frictional force, or the tire condition contributes ensuring of the friction coefficient between the road surface and the tire, etc.

(Relationship Between Slip and Road Surface Condition)

As described above, when the driving power for rotating the rear wheel 3 exceeds the frictional force generated between the tire 3a of the rear wheel 3 and the road surface, the rear wheel 3 spins. Therefore, if the friction coefficient between the tire 3a of the rear wheel 3 and the road surface is small, a normal force applied to the tire 3a is small, and as a result, a high frictional force is difficult to ensure, and the rear wheel 3 is likely to spin to a greater degree.

When the rear wheel 3 spins, a rotational speed of the rear wheel 3 which is the drive wheel becomes higher than a rotational speed of the front wheel 2 which is the driven wheel. Therefore, a value corresponding to a difference between the rotational speed of the rear wheel 3 and the rotational speed of the front wheel 2 may be expressed as a slip value S indicating the degree to which the rear wheel 3 spins (see Embodiment 1 and Embodiment 2). The slip value S may be derived by subtracting the rotational speed of the front wheel 2 from the rotational speed of the rear wheel 3, by dividing the value obtained by this subtraction by the rotational speed of the front wheel 2, or otherwise, by subtracting the vehicle speed from the rotational speed of the rear wheel 3.

When the engine driving power exceeds the frictional force which can absorb the engine driving power, a wheel spin occurs. Therefore, the degree to which the rear wheel 3 spins may be represented by a degree to which the engine driving power exceeds a limit value of the frictional force. Therefore, the value depending on the torque may be expressed as the slip value S. The torque generated in the engine 13 is a product of an angular acceleration of an engine output shaft, i.e., crankshaft 27 and an inertia moment of a drive system. The inertia moment is a constant according to a transmission gear position G. Therefore, the angular acceleration of the crankshaft 27 is proportional to the torque unless the transmission gear position G is unchanged. For this reason, the angular acceleration of the crankshaft 27 may be treated as the slip value S as a value depending on the generated torque. Since the angular acceleration of the crankshaft 27 is proportional to an angular acceleration of a rotary member rotatable to transmit the driving power from the rear wheel 3 to the road surface, i.e., a rotary member provided on the driving power transmission path 17, and an angular acceleration of the rear wheel 3, the angular acceleration of the rotary member provided on the driving power transmission path 17, or the angular acceleration of the rear wheel 3 may be treated as the slip value S. Another physical phenomenon may be used to measure the slip value S, or the above mentioned physical phenomena may be combined compositely. Thus, the values variable according to an amount of the wheel spin are used as the slip value S.

Figures 3, 4:
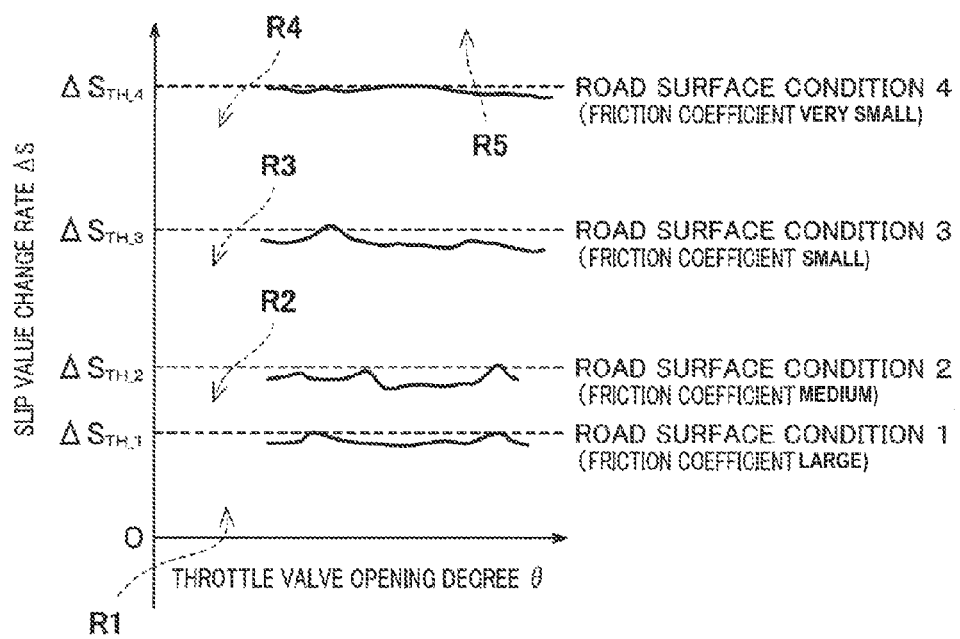
FIG. 3 is a view showing a relationship among a road surface condition, a slip value, and a slip value change rate which are obtained in a driving test of the motorcycle.
FIG. 4 is a graph showing a change rate of the slip value with respect to a throttle valve opening degree which is obtained in the driving test of the motorcycle.

FIG. 3 is a view showing a relationship between a road surface condition, an average value of the slip value S, and an average value of a change value ΔS of a slip value per unit time (hereinafter referred to as a slip value change rate). In the left part of FIG. 3, as the reference numeral assigned to the road surface is smaller, the corresponding friction coefficient between the road surface and the tire is higher. The slip value S and the slip value change rate ΔS are represented by ratios with respect to the slip value S (1) and the slip value change rate ΔS (1) corresponding to the road surface condition 1, respectively.

With reference to FIG. 3, it was found that there is no correlation between a change in the friction coefficient and a change in the slip value S, from a result of a driving test. On the other hand, it was found that the slip value change rate ΔS is higher as the friction coefficient is smaller, and there is a high correlation between the friction coefficient and the slip value change rate ΔS. The slip value change rate ΔS is a value indicating a rate with which the degree of the wheel spin changes. It was found that as the friction coefficient is smaller, an increasing rate of the degree to which the rear wheel 3 spins after start of the wheel spin is higher.

FIG. 4 is a graph showing a maximum value of the slip value change rate ΔS with respect to a throttle valve opening degree θ which is obtained from the driving test of the motorcycle 1. As can be seen from FIG. 4, the maximum value of the slip value change rate ΔS does not change significantly regardless of the magnitude of the throttle valve opening degree θ, in each of a plurality of road surface conditions with friction coefficients different from each other.

(Determination of Road Surface Condition)

Figure 5:
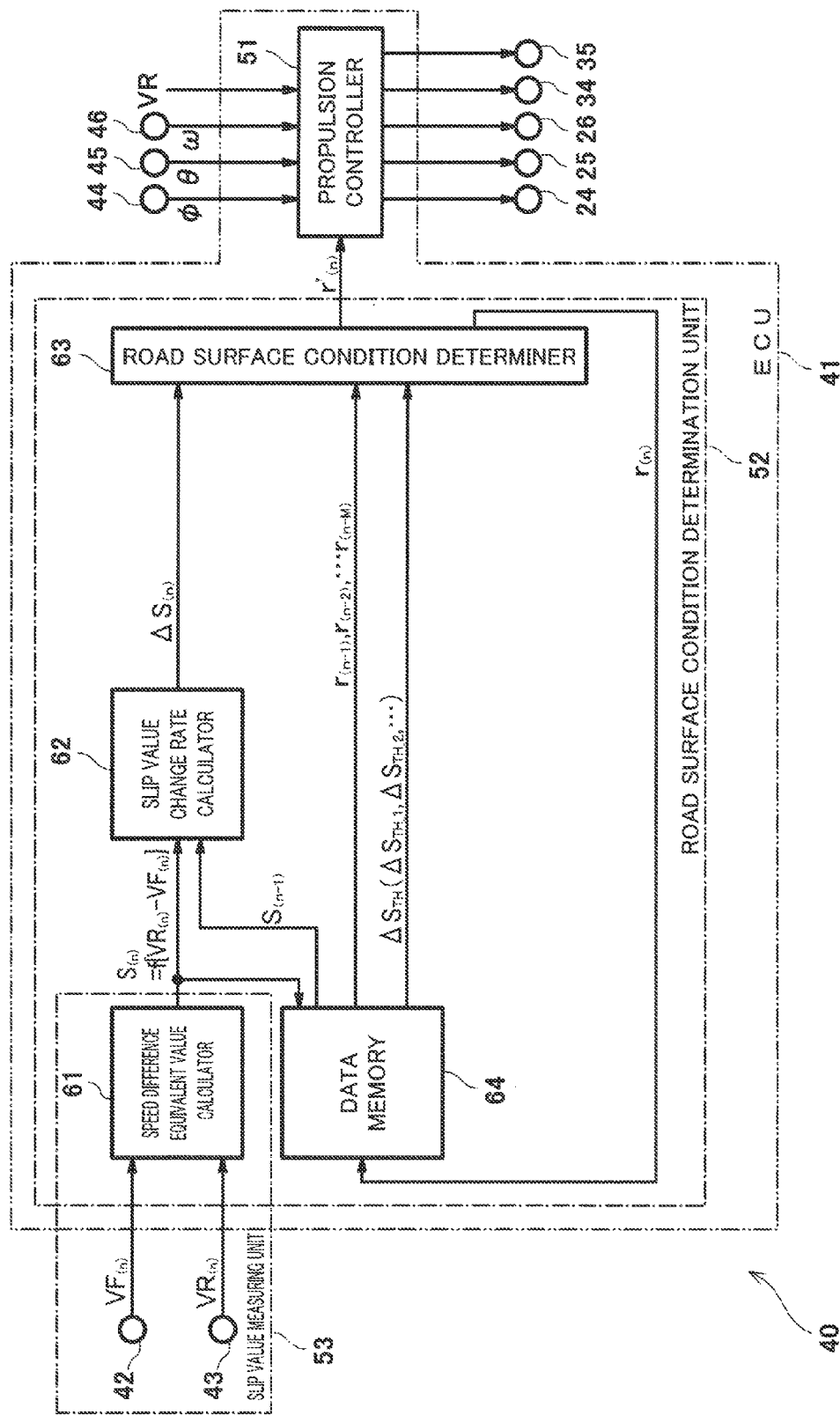
FIG. 5 is a block diagram showing a configuration of a control system according to Embodiment 1 of the present invention.

FIG. 5 is a block diagram showing an overall configuration of a control system 40 according to Embodiment 1 of the present invention. Referring to FIG. 5, the control system 40 in the motorcycle 1 includes an ECU 41 and sensors 42-46 configured to detect driving states of the motorcycle. The ECU 41 includes a propulsion controller 51, and a road surface condition determination unit 52. The road surface condition determination unit 52 is configured to determine a road surface condition based on the driving states detected by the sensors 42-46. The road surface condition determination unit 52 is configured to determine the road surface condition based on the above mentioned correlation between the road surface condition and the slip value change rate.

The road surface condition determination unit 52 includes a speed difference equivalent value calculator 61, a slip value change rate calculator 62, a road surface condition determiner 63 and a data memory 64. The sensors 42 and 43 output detected values to the ECU 41 in every predetermined sampling cycle, and components constituting the road surface condition determination unit 52 output a calculated value in every sampling cycle. Hereinafter, a subscript (n) represents an instant value detected or calculated at a time point, and a subscript (n−1) represents an instant value detected or calculated at a time point one cycle prior to the time point corresponding to (n), except otherwise noted.

The speed difference equivalent value calculator 61 measures the slip value $S_{(n)}$ based on a rotational speed $VF_{(n)}$ of the front wheel 2 which is detected by the front wheel rotational speed sensor 42 and a rotational speed $VR_{(n)}$ of the rear wheel 3 which is detected by the rear wheel rotational speed sensor 43. Therefore, in the control system of this embodiment, the front wheel rotational speed sensor 42, the rear wheel rotational speed sensor 43, and the speed difference equivalent value calculator 61 constitute a slip value measuring unit 53 configured to measure the slip value $S_{(n)}$. In this embodiment, the slip value $S_{(n)}$ is calculated according to a formula (1). The slip value $S_{(n)}$ measured by the slip value measuring unit 53 is temporarily stored in the data memory 64 and input to the slip value change rate calculator 62.

$$Sn_{(n)} = (VR_{(n)} - VF_{(n)})/VF_{(n)} \qquad (1)$$

The slip value change rate calculator 62 calculates a slip value change rate $\Delta S_{(n)}$ (i.e., slip value change rate) per unit time (sampling cycle in this example) based on the slip value $S_{(n)}$ received as an input from the slip value measuring unit 53 and a slip value $S_{(n-1)}$ which is one cycle prior to a current cycle and is stored in the data memory 64. The slip value change rate $\Delta S_{(n)}$ is calculated according to a formula (2).

$$\Delta S_{(n)} = S_{(n)} - S_{(n-1)} \qquad (2)$$

The road surface condition determiner 63 is configured to determine a road surface condition $r_{(n)}$ based on the slip value change rate $\Delta S_{(n)}$ received as an input from the slip value change rate calculator 62. For this determination, the data memory 64 contains a plurality of thresholds $\Delta S_{TH}$ ($\Delta S_{TH\_1}$, $\Delta S_{TH\_2}$, etc.) which are compared to the slip value change rate $\Delta S_{(n)}$ in the road surface condition determiner 63.

Turning back to FIG. 4, $\Delta S_{TH\_1}$, $\Delta S_{TH\_2}$, $\Delta S_{TH\_3}$, and $\Delta S_{TH\_4}$ stored in the data memory 64 are set to values which are close to maximum values of the slip value change rates $\Delta S_{(n)}$ of the road surface conditions 1-4, respectively. For example, the first threshold $\Delta S_{TH\_1}$ is set to a value close to the maximum value of the slip value change rate $\Delta S_{(n)}$ corresponding to the "road surface condition 1."

As described above, the maximum value of the slip value change rate $\Delta S_{(n)}$ is different depending on the road surface condition, and therefore the respective thresholds $\Delta S_{TH}$ are set to values different from each other. For this reason, numeric value ranges R1-R5 which are more than the number of the plurality of thresholds $\Delta S_{TH}$ stored in the data memory 64, by one, can be defined using these thresholds. For example, the first numeric value range R1 is a numeric value range which is less than the first threshold $\Delta S_{TH\_1}$ corresponding to the "road surface condition 1" and does not have a lower limit value. When the motorcycle 1 is driving under the "road surface condition 1", the slip value change rate $\Delta S$ has a tendency to lie within the first numeric value range R1. The second numeric value range R2 is a numeric value range which is not less than the first threshold $\Delta S_{TH\_1}$ and is less than the second threshold $\Delta S_{TH\_2}$ corresponding to the "road surface condition 2". When the motorcycle 1 is driving under the "road surface condition 2", the slip value change rate $\Delta S$ has a tendency to lie within the second numeric value range R2. Like the second numeric value range R2, the third numeric value range R3 and the fourth numeric value range R4 are defined by the second threshold $\Delta S_{TH\_2}$, the third threshold $\Delta S_{TH\_3}$ corresponding to the "road surface condition 3", and the fourth threshold $\Delta S_{TH\_4}$ corresponding to the "road surface condition 4". The fifth numeric value range R5 is a numeric value range which is not less than the fourth threshold $\Delta S_{TH\_4}$ and does not have an upper limit value.

Turning back to FIG. 5, the road surface condition determiner 63 compares the slip value change rate $\Delta S_{(n)}$ received as an input from the slip value change rate calculator 62 to the plurality of thresholds $\Delta S_{TH}$ ($\Delta S_{TH\_1}$, $\Delta S_{TH\_2}$, etc.) received as an input from the data memory 64. The road surface condition determiner 63 determines a road surface condition $r_{(n)}$ according to which of the plurality of numeric value ranges R1-R5 defined by the thresholds $\Delta S_{TH}$ ($\Delta S_{TH\_1}$, $\Delta S_{TH\_2}$, etc.), the slip value change rate $\Delta S_{(n)}$ lies. For example, if the slip value change rate $\Delta S_{(n)}$ lies within the first numeric value range R1, it is determined that the road surface condition $r_{(n)}$ is the "road surface condition 1". The road surface condition $r_{(n)}$ determined by the road surface condition determiner 63 is stored in the data memory 64. In this embodiment, the road surface condition determiner 63 is configured to determine which of the five conditions the road surface condition lies, but may be configured to determine which of two or more conditions the road surface condition lies. Since the slip value change rate itself may indicate the road surface condition, the road surface condition determiner 63 may determine the road surface condition based on the slip value change rate itself, or the slip value change rate may be utilized in vehicle control as a control parameter indicating the road surface condition.

Here it is assumed that $r_{(n)}$ is a latest instant value of the road surface condition. The road surface condition determiner 63 decides an output value $r'_{(n)}$ of the road surface condition based on the latest instant value $r_{(n)}$ of the road surface condition, and a plurality of prior instant values $r_{(n-1)}$, $r_{(n-2)}$, ... $r_{(n-M)}$ (M: natural number) of the road surface conditions stored in the data memory 64, and the decided output value $r'_{(n)}$ is provided as input to the propulsion controller 51. The propulsion controller 51 controls the motorcycle 1 according to the road surface condition represented by the output value $r'_{(n)}$.

FIG. 5 illustrates a case where the output value r' is decided with reference to M prior values $r_{(n-1)}$, $r_{(n-2)}$, ... $r_{(n-M)}$. In this case, the output value r' is decided by considering data of the road surface condition which is a predetermined time period T (see FIG. 6) back from a time point when the latest instant value $r_{(n)}$ of the road surface condition is obtained. The predetermined time period T is obtained by multiplying the number M of the prior values referred to, by the sampling cycle. In this embodiment, a road surface condition determined according to a maximum value of a slip value change rate within the time period T is decided as the output value $r'_{(n)}$.

Figure 6:
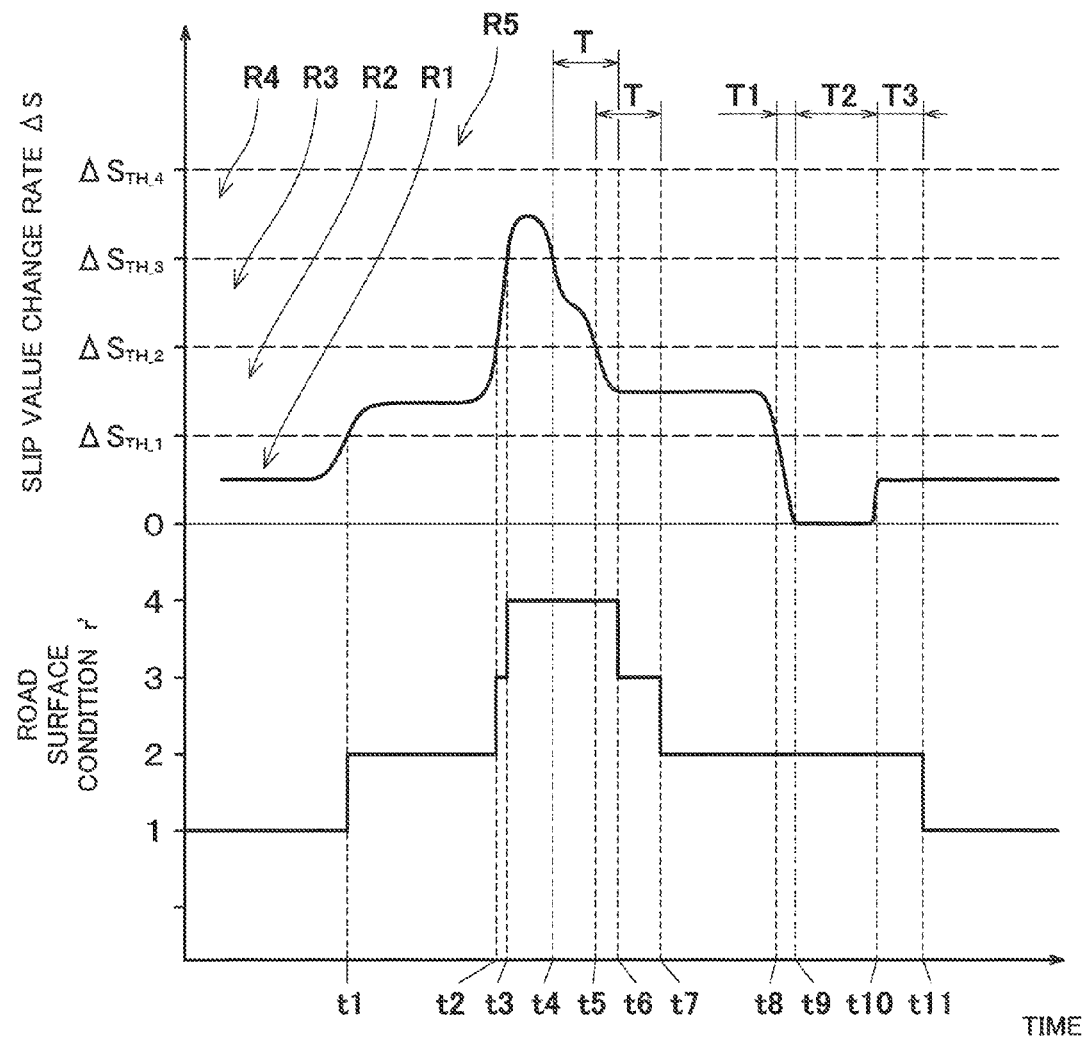
FIG. 6 is a timing chart showing an example of a change in the slip value change rate, and a change in a road surface condition which is determined in a determination unit.

FIG. 6 is a timing chart showing an example of a change in the slip value change rate $\Delta S$ and a change in the output value r' of the road surface condition decided by the road surface condition determiner 63. Referring to FIG. 6, initially, the slip value change rate $\Delta S$ lies within the first numeric value range R1, and therefore, the output value r' is decided as the "road surface condition 1." Thereafter, when the slip value change rate $\Delta S$ changes so as to exceed the first threshold $\Delta S_{TH\_1}$ and to lie within the second numeric value range R2, the slip value change rate $\Delta S$ at a time point t1 when the slip value change rate $\Delta S$ exceeds the first threshold $\Delta S_{TH\_1}$, is a maximum value in a period prior to the time point t1. Therefore, at the time point t1, the output value r' is changed into the "road surface condition 2". When the slip value change rate $\Delta S$ exceeds each of the second threshold $\Delta S_{TH\_2}$ and the third threshold $\Delta S_{TH\_3}$ thereafter, the output value r' is changed correspondingly (see time point t2, t3).

Now, it is supposed that the slip value change rate $\Delta S$ lying in the fourth numeric value range R4 changes so as to fall below the third threshold $\Delta S_{TH\_3}$ and to lie into the third numeric value range R3. In this case, the slip value change rate $\Delta S$ is decreasing, and therefore, the slip value change rate $\Delta S$ at a time point t4 when the slip value change rate $\Delta S$ falls below the third threshold $\Delta S_{TH\_3}$ is not a maximum value in a period prior to the time t4. For this reason, when the numeric value range in which the slip value change rate $\Delta S$ lies is changed because of a decrease in the slip value change rate $\Delta S$, the output value r' of the road surface condition is not changed.

Thereafter, if an event that the slip value change rate $\Delta S$ lies within the fourth numeric value range R4 again does not occur, the output value r' of the road surface condition is changed into the "road surface condition 3" at a time point t6 which is a lapse of the predetermined time period T after the time point t4 when the slip value change rate $\Delta S$ falls below the third threshold $\Delta S_{TH\_3}$. This is because the maximum value in a period which is the predetermined time period T back from the time t6 is the third threshold $\Delta S_{TH\_3}$. The same occurs in a relationship between a time point t5 when the slip value change rate $\Delta S$ falls below the second threshold $\Delta S_{TH\_2}$ and a time point t7 when the output value r' of the road surface condition is changed from the "road surface condition 3" into the "road surface condition 2." Furthermore, the same occurs in a relationship between a time point when the slip value change rate $\Delta S$ falls below the first threshold $\Delta S_{TH\_1}$ and a time point when the output value r' of the road surface condition changes from the "road surface condition 2" into the "road surface condition 1."

Here, it is supposed that the vehicle stops before a lapse of the predetermined time period T after the slip value change rate $\Delta S$ falls below the second threshold $\Delta S_{TH\_2}$ and thereafter the vehicle starts driving. At a time point t8, the slip value change rate $\Delta S$ is below the second threshold $\Delta S_{TH\_2}$, at a time point t9, the vehicle stops, and a time period T1 is a period that lapses from the time point t8 until the time point t9. At a time point t10, the vehicle re-starts driving, and a time period T2 is a stop period from the time point t9 until the time point t10. At a time point t11, a specified time period T3 lapses after the time point 10 when the vehicle re-starts driving.

In this case, a slip value change rate during the time period T2 is not taken into account when the output value r' of the road surface condition is decided. In other words, until the time point t11 when a sum of the time period T1 and the time period T3 after the time point t10 when the vehicle re-starts driving reaches the predetermined time period T is reached, the slip value change rate $\Delta S$ before the time point t8 is taken into account to decide the output value r', and the output value r' is reflected by the fact that the slip value change rate $\Delta S$ is below the first threshold $\Delta S_{TH\_1}$ at the time point t11.

As should be appreciated from the above, in this embodiment, the road surface condition determination unit 52 is configured to determine the road surface condition with reference to the slip value change rate $\Delta S$. As the friction coefficient between the road surface and the tire 3a of the rear wheel 3 decreases, the slip value S increases at a higher rate and the slip value change rate $\Delta S$ increases after start of the wheel spin. Therefore, with the above configuration, the road surface condition can be determined suitably.

If the slip value change rate $\Delta S$ increasingly crosses the threshold $\Delta S_{TH}$, i.e., it is supposed that the friction coefficient between the road surface and the tire 3a of the rear wheel 3 has decreased, thus, the output value r' of the road surface condition changes according to that change. Thus, it is possible to promptly address a situation where the road surface condition has changed to a condition in which a wheel spin is likely to occur.

If the slip value change rate $\Delta S$ decreasingly crosses the threshold $\Delta S_{TH}$, i.e., it is supposed that the friction coefficient between the road surface and the tire 3a of the rear wheel 3 has increased, thus, changing of the output value r' of the road surface condition does not occur until a predetermined time period lapses. This makes it possible to avoid a misdetermination that the road surface condition has changed, in a case where the engine driving power rapidly has decreased in response to the driver's operation of the throttle grip 19 to suppress occurrence of a wheel slip, even though the road surface condition does not change actually.

Since the slip value change rate corresponding to a vehicle speed of zero is not referred to in determination of the road surface condition, it is possible to avoid misdetermination of the road surface condition based on detected values and calculated values in a driving state in which no wheel spin occurs.

The propulsion controller 51 controls the motorcycle 1 based on the driving state and the output value r' of the road surface condition received as an input from the road surface condition determination unit 52. For example, the propulsion controller 51 controls the valve actuator 24 of the throttle device 16, the fuel feeder 25, the igniter 26 and the front and rear brake devices 34 and 35, based on an angular speed $\omega$(engine speed) of the crankshaft 27 detected by the angular speed sensor 44, the throttle valve opening degree $\theta$ detected by the throttle valve position sensor 45, the operation amount $\phi$ of the throttle grip 19 detected by the grip position sensor 46, and the rotational speed VR (i.e., vehicle speed) of the rear wheel 3 detected by the rear wheel rotational speed sensor 43. Through the control of these devices, the propulsion controller 51 can carry out traction control, driving power restriction control, starting control, acceleration and deceleration control, steering damper control, suspension absorber control based on vehicle weight determination, ABS control, and CBS control, according to the road surface condition.

For example, the propulsion controller 51 may control the valve actuator 24, the fuel feeder 25 and/or the igniter 26 to suppress the engine driving power, when it receives an output value r' indicating that the friction coefficient between the road surface and the tire 3a of the rear wheel 3 is low. This makes it possible to avoid the rear wheel 3 from spinning according to the road surface condition. Alternatively, in addition to or instead of the control of the valve actuator 24, the fuel feeder 25 and the igniter 26, the front and rear brake devices 34 and 35 may be actuated to reduce the driving power transmitted from the rear wheel 3 to the road surface. In this case, it is also possible to avoid the rear wheel 3 from spinning according to the road surface condition. In this way, the propulsion controller 51 of this embodiment can suitably control the motorcycle 1 according to the road surface condition.

The road surface condition determination unit 52 may be configured to output the output value r' of the road surface condition to devices or controllers other than the propulsion controller 51. For example, the road surface condition determination unit 52 may output the output value r' of the road surface condition to a display device attached on an instrument panel, and the display device may display the output value r' of the road surface condition to be presented to the driver. This enables the driver to determine the road surface condition conveniently. The road surface condition determination result may be stored in association with a driving state and an engine state so that it can be utilized in a vehicle design and improvement of an operation technique. The road surface condition determination result may be transmitted to outside the vehicle via radio waves so that another driver can drive the vehicle while referring to the road surface condition.

The slip value change rate $\Delta S$ tends to be large during starting when the engine driving power starts to be transmitted to the rear wheel 3, even under the same road surface condition. Therefore, the road surface condition can be determined more accurately by performing the determination process during the starting.

The road surface condition determination unit 52 is configured to determine the road surface condition as described above. As a load applied to the tire 3a increases, the frictional force of the tire 3a increases and thereby the wheel spin is less likely to occur. As the friction coefficient of the tire 3a increases, a higher frictional force can be ensured, and the wheel spin is less likely to occur. In view of this, in a configuration similar to that of the road surface condition determination unit 52, a change in the tire 3a or a change in the number of persons straddling the motorcycle 1 may be determined. Thus, in the present invention, the road surface condition determination means determination of the frictional force generated between the road surface and the drive wheel, and the determination can be made based on a value obtained by multiplying the friction coefficient between the road surface condition and the drive wheel by the normal force associated with the drive wheel.

Embodiment 2

Figure 7:
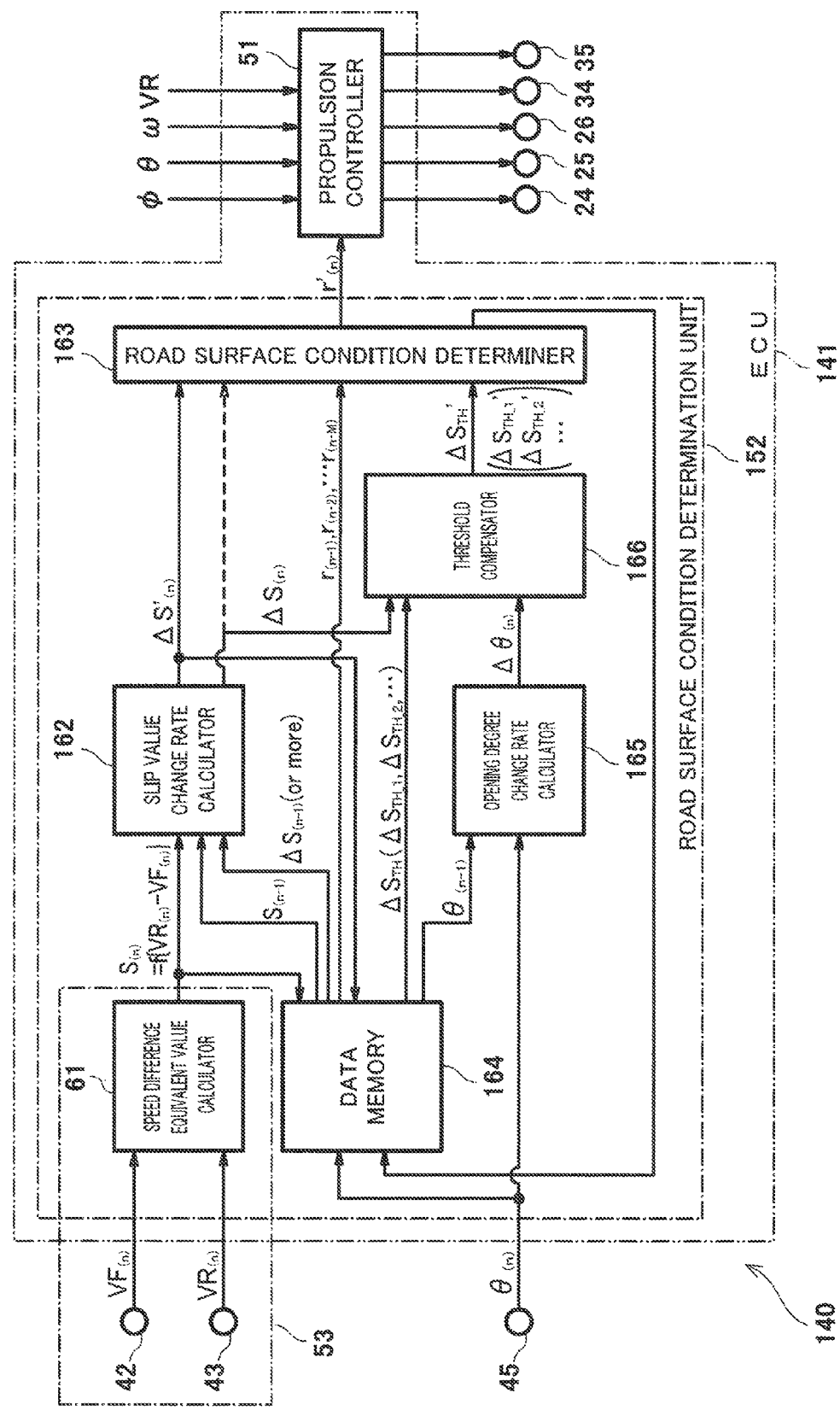
FIG. 7 is a block diagram showing a configuration of the control system according to Embodiment 2 of the present invention.

FIG. 7 is a block diagram showing an overall configuration of a control system 140 according to Embodiment 2 of the present invention. In the control system 140, a slip value change rate calculator 162, a road surface condition determiner 163 and a data memory 164 are different from the slip value change rate calculator 62, the road surface condition determiner 63 and the data memory 64 in the road surface condition determination unit 52 shown in FIG. 5. Also, an opening degree change rate calculator 165 and a threshold compensator 166 are incorporated into the control system 140.

(Determination of Road Surface Condition)

In this embodiment, the slip value change rate calculator 162 is configured to calculate the instant value $\Delta S_{(n)}$ of the slip value change rate according to the formula (2) and further calculate an integrated value $\Delta S'_{(n)}$ of the slip value change rate $\Delta S_{(n)}$ by first-order lag calculation. The integrated value $\Delta S'_{(n)}$ is calculated according to, for example, a formula (3). The integrated value $\Delta S'_{(n)}$ is temporarily stored in the data memory 164 and provides input to the road surface condition determiner 163.

$$\Delta S'_{(n)} = \Delta S'_{(n-1)} + \{\Delta S_{(n)} - \Delta S'_{(n-1)}\} K \quad (3)$$

$\Delta S'_{(n-1)}$ indicates an integrated value which is calculated by the slip value change rate calculator 162 at a time point which is one cycle prior to a time point when $\Delta S'_{(n)}$ is calculated, and is stored in the data memory 164. For example, K is a first-order lag calculation coefficient and is suitably set to a positive value less than one (0<K<1).

The road surface condition determiner 163 determines the road surface condition $r_{(n)}$ according to the integrated value $\Delta S'_{(n)}$ of the slip value change rate which is received as an input from the slip value change rate calculator 162. In this embodiment, the thresholds $\Delta S_{TH}$ ($\Delta S_{TH\_1}$, $\Delta S_{TH\_2}$, etc.) stored in the data memory 164 are compensated by the threshold compensator 166 and the road surface condition $r_{(n)}$ is determined according to a result of comparison between the compensated values $\Delta S_{TH'}$ ($\Delta S_{TH\_1'}$, $\Delta S_{TH\_2'}$, etc.) and the integrated value $\Delta S'_{(n)}$.

The threshold compensator 166 is configured to compensate the threshold $\Delta S_{TH}$ according to the driving state. FIG. 7 illustrates a case where the threshold $\Delta S_{TH}$ is compensated based on the slip value change rate $\Delta S_{(n)}$ calculated by the slip value change rate calculator 162 and the change rate $\Delta \theta_{(n)}$ of the throttle valve opening degree (opening degree change rate).

The opening degree change rate $\Delta \theta_{(n)}$ is calculated like the slip value change rate $\Delta S_{(n)}$. To be specific, the opening degree change rate calculator 165 calculates the opening degree change rate $\Delta \theta_{(n)}$ based on the throttle valve opening degree $\theta_{(n)}$ detected by the throttle valve position sensor 45 and a prior value $\theta_{(n-1)}$ which is obtained in a cycle which is one cycle prior to the current cycle in which the throttle valve opening degree $\theta_{(n)}$ is obtained, according to a formula (4).

$$\Delta \theta_{(n)} = \theta_{(n)} - \theta_{(n-1)} \quad (4)$$

The threshold compensator 166 compensates the threshold $\Delta S_{TH}$ in such a manner that the threshold $\Delta S_{TH}$ is smaller as the instant value $\Delta S_{(n)}$ of the slip value change rate is larger, and is larger as the opening degree change rate $\Delta \theta_{(n)}$ is a positive value and is larger. The threshold compensator 166 calculates the compensated threshold $\Delta S_{TH'(n)}$ ($\Delta S_{TH\_1'(n)}$, $\Delta S_{TH\_2'(n)}$ ...) according to a formula (5).

$$\Delta S_{TH'(n)} = \Delta S_{TH} + f1\{\Delta S_{(n)}\} + f2\{\Delta \theta_{(n)}\} \quad (5)$$

The road surface condition determiner 163 compares the integrated value $\Delta S'_{(n)}$ of the slip value change rate calculated by the slip value change rate calculator 162 to the compensated value $\Delta S_{TH'(n)}$ ($\Delta S_{TH\_1'(n)}$, $\Delta S_{TH\_2'(n)}$, etc.). The road surface condition determiner 163 determines the road surface condition $r_{(n)}$ based on which of the ranges defined by the compensated values $\Delta S_{TH'(n)}$, the integrated value $\Delta S'_{(n)}$ lies within.

In this embodiment, the road surface condition is determined by referring to the integrated value $\Delta S'_{(n)}$ of the slip value change rate. For this reason, even if the slip value change rate $\Delta S_{(n)}$ rapidly changes irrespective of an actual road surface condition, because of the fact that the driving power transmitted to the rear wheel 3 abruptly changes, or the motorcycle has driven on, for example, a manhole lid with a different friction coefficient, an influence of a noise value on the slip value change rate is lessened, and it is possible to suppress misdetermination of the road surface condition.

In this embodiment, the threshold compensator 166 compensates the threshold according to the driving state and the engine running state. This makes it possible to avoid misdetermination of the road surface condition in response to a change in the slip value change rate due to a change in the driving state.

Especially, in this embodiment, the threshold $\Delta S_{TH}$ is compensated in such a manner that the threshold $\Delta S_{TH}$ is larger as the opening degree change rate $\Delta \theta$ is a positive value and is larger. The fact that the opening degree change rate $\Delta \theta$ is a positive value implies that the driver's request for acceleration is strong and the engine driving power is increasing. If the driving power transmitted to the rear wheel 3 increases rapidly and thereby the slip value change rate increases under this condition, the threshold becomes higher correspondingly. As a result, it is possible to suppress misdetermination of the road surface condition.

In addition to the opening degree change rate $\Delta \theta_{(n)}$, it can be detected that the driver's request for acceleration is strong and the engine driving power is increasing. For example, an opening degree request value (in this embodiment, an operation position of the throttle grip 7 or a throttle valve opening degree $\theta$), a change rate of the engine speed, a reduction gear ratio, a driving acceleration, etc, may be provided as input to the threshold compensator 166, instead of the opening degree change rate $\Delta \theta_{(n)}$. In this case, also, an influence of a noise value on the slip value change rate $\Delta S$ is lessened.

Moreover, a gripping characteristic of the motorcycle 1 can be determined by deriving a relationship between the slip value and the throttle valve opening degree (opening degree request value) in the driving state of the motorcycle 1. For example, the road surface condition derived based on the slip value change rate may be compensated according to the gripping characteristic derived from the slip value and the throttle valve opening degree. For example, in a case where the gripping capability is low, it may be determined that the frictional coefficient is higher in an actual road surface than the road surface condition derived from the slip value change rate. Thus, the road surface condition may be more accurately determined based on the slip value change rate and the gripping capability of the motorcycle 1.

If the instant value $\Delta S_{(n)}$ of the slip value change rate increases rapidly, the threshold is compensated to be higher according to such an increase. This reduces a chance of misdetermination that the road surface condition has changed with respect to an inadvertent change of the slip value change rate.

Although in this embodiment, a case where a configuration for determining the road surface condition based on the integrated value and a configuration for compensating for the threshold used for determination of the road surface condition are both provided is described, only one of them may be provided. The opening degree change rate calculator 165 and the threshold compensator 166 may be omitted from the constituents shown in FIG. 7 as desired. The formula (4) may be changed so that the integrated value is calculated using a plurality of prior instant values, and compensation terms in the formula (5) may be omitted, changed or added suitably.

When $\Delta S_{(n)}$ is a latest value, the road surface condition $r_{(n)}$ is determined based on this latest value in Embodiment 1, while the road surface condition $r_{(n)}$ is determined based on the integrated value in Embodiment 2. Alternatively, as indicated by a dotted-line arrow in FIG. 7, the road surface condition determiner 163 may be configured to determine road surface condition $r_{(n)}$ based on both of the latest instant value $\Delta S_{(n)}$ and the integrated value $\Delta S'_{(n)}$.

As the integrated value, a value other than the value obtained by the first-order lag calculation may be used. For example, as the integrated value, an average value or an integral value of the slip value change rate over a plurality of prior cycles may be used. In a case where the instant value and the integrated value are both used, weighting may be made different between the instant value and the integrated value. For example, the weighting may be made different according to the driver's preference, a driving state, or an engine running state. In a case where an influence of a noise is preferably lessened, weighting is set larger for the integrated value than for the instant value. In a case where an instantaneous responsiveness is preferably improved, weighting is set larger for the instant value than for the integrated value. For example, the weighting may be set larger for the integrated value than for the instant value in a ratio of 4:6.

Embodiment 3

Evaluation of Vehicle Characteristic

Figure 8:
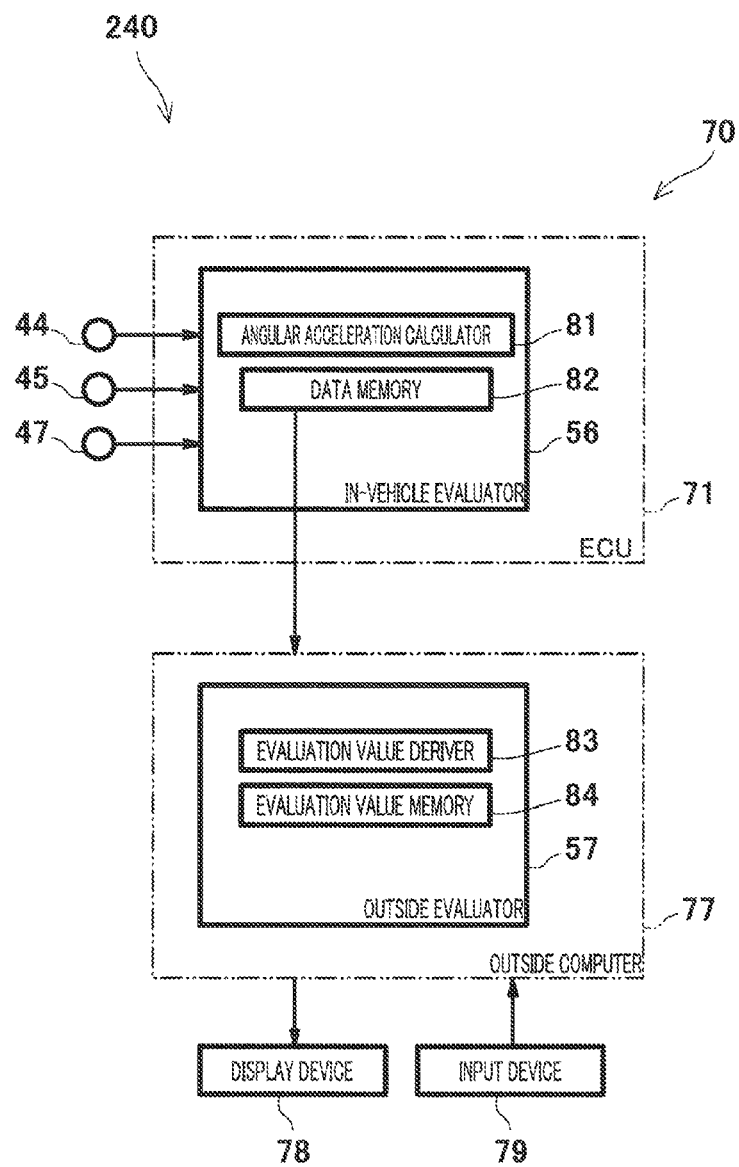
FIG. 8 is a block diagram showing an overall configuration of a control system and a vehicle characteristic evaluation system according to Embodiment 3 of the present invention.

FIG. 8 is a block diagram showing an overall configuration of a control system 240 and a vehicle characteristic evaluation system 70 according to Embodiment 3 of the present invention. Referring to FIG. 8, the vehicle characteristic evaluation system 70 includes an ECU 71, an outside computer 77 provided outside the motorcycle 1, the angular speed sensor 44, the throttle valve position sensor 45, and a transmission gear position sensor 47 configured to detect a transmission gear position of the transmission.

The ECU 71 includes an in-vehicle evaluator 56. The outside computer 77 includes an outside evaluator 57, a display device 78, and an input device 79 operated by an operator. The in-vehicle evaluator 56 and the outside evaluator 57 include discrete constituents 81-84 required to derive and store a vehicle characteristic evaluation value f1 (hereinafter simply referred to as "evaluation value") used to evaluate the characteristic of the motorcycle 1 based on the detected values from the sensors 44, 45 and 47 during driving. In this embodiment, the in-vehicle evaluator 56 includes an angular acceleration calculator 81 configured to calculate a difference vale of an angular speed of the crankshaft 27 per unit time based on the detected value of the angular speed sensor 44, and a data memory 82 configured to store the detected value and the calculated value. The outside evaluator 57 includes an evaluation value deriver 83 configured to derive the evaluation value f1 based on the data stored in the data memory 82 and an evaluation value memory 84 configured to store the evaluation value f1. Data transmission and reception between the data memory 82 and the evaluation value deriver 83 may be performed via any suitable method such as wires, radio waves, a storage medium, etc Data used to derive the evaluation value f1 is sequentially obtained in every predetermined sampling cycle (e.g., 5-40 msec). The data used to derive the evaluation value f1 is sampled for a sufficiently long time period (e.g., several minutes) during driving. This sufficiently long time period is a time period required to prevent only data in a minute time period including starting of a wheel spin or in a very short period such as a transient state during which an unusual driving state occurs, from being sampled, and is a time period required to obtain data of a significant number in deriving the evaluation value f1, in view of a cycle in which the data is obtained.

The control system 70 may be utilized in, for example, a design process and a manufacturing process of the motorcycle 1. In this case, the data used to derive the evaluation value f1 is obtained in, for example, a test course. If an evaluation value memory is mounted into the ECU as described later, the present system can be utilized in a stage where the motorcycle 1 is used by a user.

Figure 9:
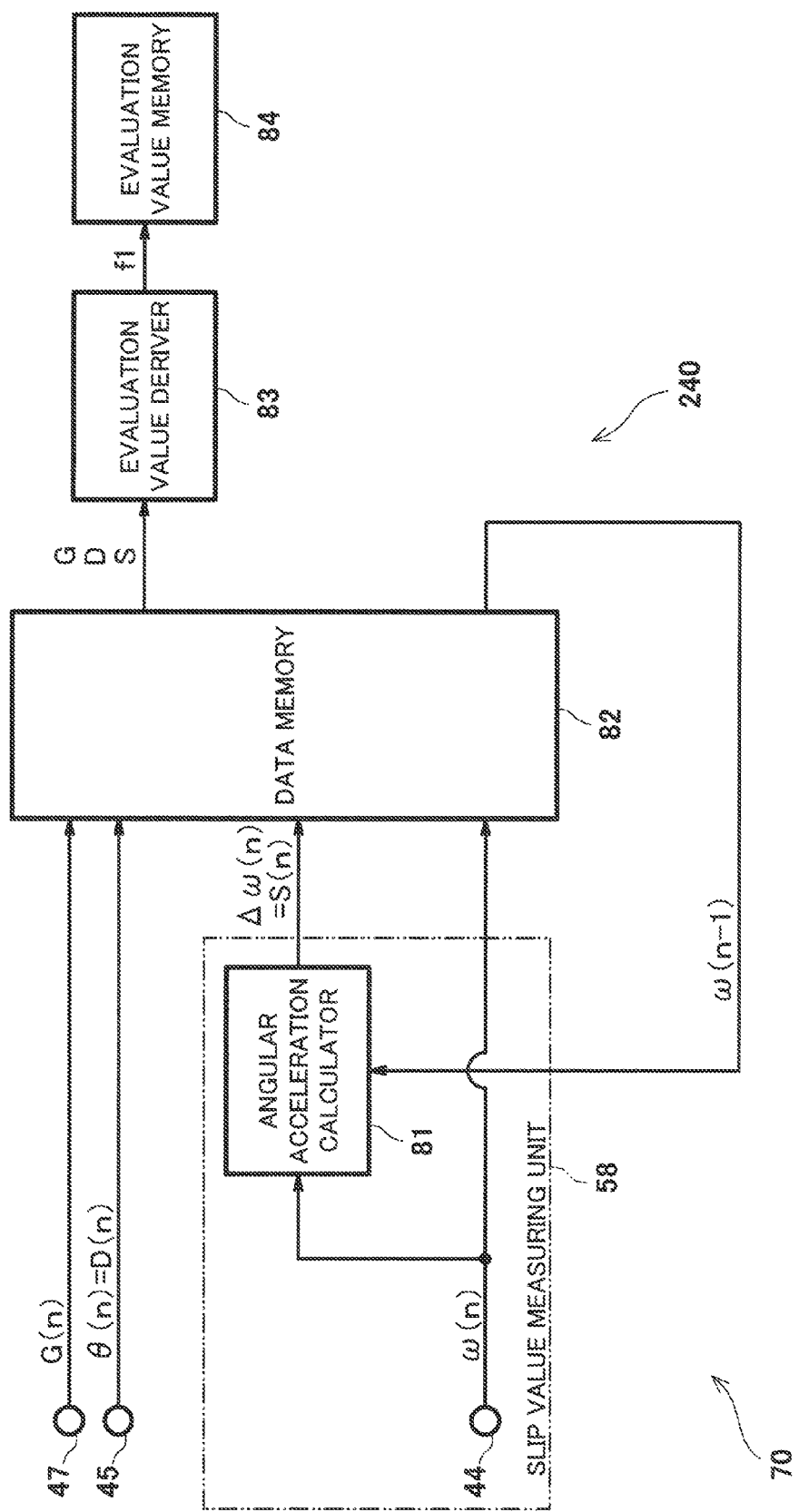
FIG. 9 is a block diagram showing a detailed configuration of a control system of FIG. 8.

FIG. 9 is a block diagram showing a detailed configuration of the control system 70 of FIG. 8. Referring to FIG. 9, the throttle valve position sensor 45 detects the throttle valve opening degree $\theta_{(n)}$ as a driving power increase/decrease request value $D_{(n)}$. Since the driving power increase/decrease request value D may also be expressed as the operation position of the throttle grip 19, the throttle valve position sensor 45 may be replaced by a grip position sensor. The throttle valve opening degree $\theta_{(n)}$ ($D_{(n)}$) detected by the throttle valve position sensor 45 is stored in the data memory 82 in association with a detection time point. In addition, the transmission gear position $G_{(n)}$ detected by the transmission gear position sensor 47 is stored in the data memory 82 in association with a detection time point.

The vehicle characteristic evaluation system 70 includes a slip value measuring unit 58 configured to measure the slip value S indicating a degree to which the rear wheel 3 driven by the engine 13 spins. In this embodiment, the slip value measuring unit 58 measures an angular acceleration $\Delta \omega$ of the crankshaft 27 as the slip value S. Therefore, the slip value measuring unit 58 includes the above mentioned angular speed sensor 44 and an angular acceleration calculator 81. The angular speed sensor 44 detects a rotational number of the crankshaft 27 per unit time as the angular speed $\omega$ of the crankshaft 27. The angular acceleration calculator 81 calculates a difference value $\Delta \omega_{(n)}$ of the angular speed w of the crankshaft 27 per unit time (hereinafter referred to as an angular acceleration of the crankshaft 27). The angular acceleration calculator 81 sequentially calculates the angular acceleration $\Delta \omega$ of the crankshaft 27 as the slip value $S_{(n)}$, according to a formula (4). For this calculation, the detected value $\omega_{(n)}$ of the angular speed sensor 44 is temporarily stored in the data memory 82.

$$S_{(n)} = \Delta \omega_{(n)} = \omega_{(n)} - \omega_{(n-1)} \qquad (4)$$

The angular acceleration $\Delta \omega$ calculated by the angular acceleration calculator 81 is stored in the data memory 82 in association with a time point of calculation, to be precise, at a time point when the angular speed $\omega_{(n)}$ used to derive the calculated value is detected.

As described above, the data memory 82 contains the throttle valve opening degree $\theta_{(n)}$, the angular acceleration $\Delta\omega$ of the crankshaft 27, and the transmission gear position $G_{(n)}$ in association with one another, in terms of the time point when these data are obtained. The evaluation value deriver 83 processes these data stored in the data memory 82, and derives as the evaluation value f1, a correlation in driving between the throttle valve opening degree $\theta$ (i.e., driving power increase/decrease request value D) and the angular acceleration $\Delta\omega$ (i.e., slip value S) of the crankshaft 27.

Initially, the evaluation value deriver 83 extracts, from the data stored in the data memory 82, an instant value of the throttle valve opening degree $\theta$ and an instant value of the angular acceleration $\Delta\omega$ of the crankshaft 27, which are obtained at a time point when a specified transmission gear position (e.g., 1st gear) is set in the transmission. In addition, the evaluation value deriver 83 extracts, from the data stored in the data memory 82, an instant value of the throttle valve opening degree $\theta$ which is not less than a predetermined throttle valve opening degree $\theta A$ and an instant value of the angular acceleration $\Delta\omega$ of the crankshaft 27, which is obtained at the same time point that the instant value of the throttle valve opening degree $\theta$ is obtained.

Figure 10:
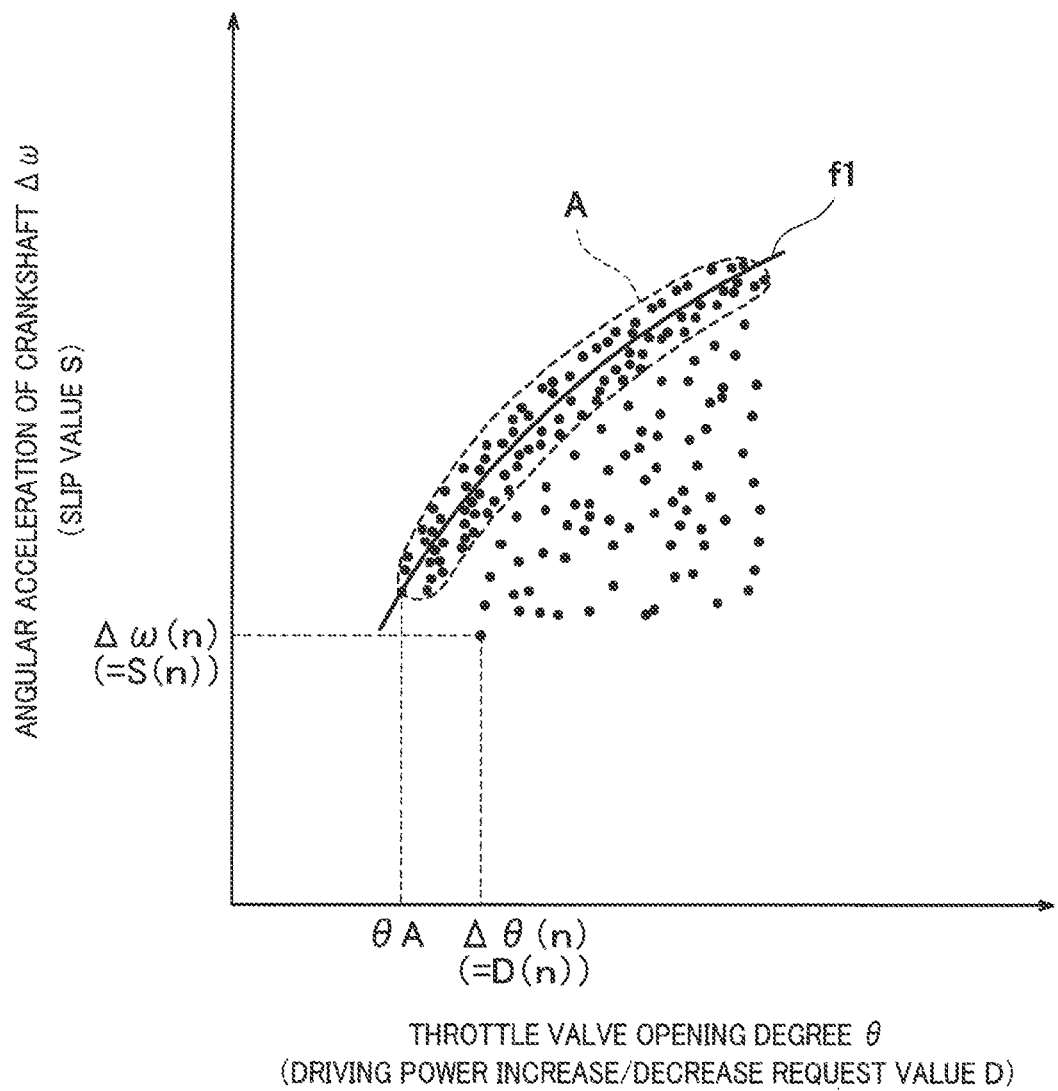
FIG. 10 is a graph showing a vehicle characteristic evaluation value derived from an evaluation value deriver of FIG. 9.

FIG. 10 is a graph showing the evaluation value f1 derived from the evaluation value deriver 83. In FIG. 10, a horizontal axis indicates the throttle valve opening degree $\theta$ and a vertical axis indicates the angular acceleration $\Delta\omega$ of the crankshaft 27 (slip value S). In a two-dimensional orthogonal coordinate system in FIG. 10, plural plots corresponding to a certain transmission gear position are depicted. Each plot represents two data consisting of the instant value of the throttle valve opening degree $\theta$ and the instant value of the angular acceleration $\Delta\omega$ of the crankshaft 27 at the time point when the instant value of the throttle valve opening degree $\theta_{(n)}$ is generated, which instant values are associated with each other in terms of the time point when these values are obtained. In other words, each plot indicates a degree of an instant value of a torque actually generated in the engine 13, according to an instant value of a certain throttle valve opening degree $\theta_{(n)}$.

When the extracted data are arranged on the two-dimensional orthogonal coordinate system, a band-like region A of the plots on the coordinate system is formed. This region A is like a parabola which protrudes upward.

As described above, when the rear wheel 3 is gripping the road surface, the generated torque makes a balance with the frictional force generated between the rear wheel 3 and the road surface, and when the generated torque exceeds the frictional force, the rear wheel 3 spins. On the other hand, the driver tends to cause the wheel spin to fall into an allowable range decided by the driver, during driving. The driver tends to perform a grip operation and/or a brake operation so that the throttle valve opening degree $\theta$ is reduced and/or the rear wheel 3 is braked to suppress the wheel spin, if the wheel spin is beyond the allowable range and the driver has difficulty in steering the motorcycle 10 with the driver's driving ability. The data memory 82 contains data obtained over a sufficiently long time period as described above.

From the above, it may be said that the data present within the region A are obtained at time points when the driver causes the degree to which the rear wheel 3 spins to fall within the allowable range and the motorcycle 1 is driving under the state where the rear wheel 3 is gripping the road surface as desired. This means that the plots within the region A indicate frictional forces making a balance with the generated torques as well as the degrees to which the engine 13 actually generates torques according to the throttle valve opening degrees $\theta$.

In FIG. 10, scattered plots are observed under the region A. These plots are data obtained at time points outside the region A, which are due to the fact that a response of the torque generated in the engine 13 is retarded with respect to an increase in the throttle valve opening degree $\theta$ which occurs in response to the driver's request (i.e., acceleration request) for increasing the driving power. Therefore, based on density of the plots scattered below the region A, a responsiveness of the engine 13 can be evaluated. As described above, the data stored in the data memory 82 are obtained over a sufficiently long time period so that the data scattered below the region A are not sampled and the region A into which the plots of data fall is formed.

Then, the evaluation value deriver 83 derives an approximation curve corresponding to these plural data (see FIG. 10). A curve fitting method (interpolation) is not particularly limited, but an approximation formula may be suitably changed. Although in this embodiment, a second-order polynomial is derived by a method of least squares, interpolation or extrapolation may be used, or the approximation formula may be a polynomial of a third order or more, a logarithm function or a trigonometric function.

As described above, since data are present within the band-like region A, which is like a parabola, the approximation curve expressed as the second-order polynomial is suitably fitted into the region A. Since the second-order polynomial is used, suitable curve fitting may be executed, and a calculation load required to derive the approximation curve can be lessened. The approximation curves derived in this way exhibit substantially the same trend even when it is derived for a driver who tends to rapidly accelerate or decelerate the vehicle and for a driver who tends to gently accelerate or decelerate the vehicle, so long as the vehicle body and the road surface used in the measurement are the same. Therefore, the data are quantitative values which do not depend on the driver.

In the vehicle characteristic evaluation system 70 of this embodiment, this approximation curve is stored as the evaluation value f1 in the evaluation value memory 84. The evaluation value f1 stored in the evaluation value memory 84 is the approximation curve fitted into the region A, in which the data gather together and suitably indicate a feature of the plotted data. To be specific, the evaluation value f1 suitably indicates the gripping capability of the motorcycle 1 making a balance with the torque generated in the engine 13, with respect to the driving power increase/decrease request value D. If the gripping capability becomes good relative to the output capability of the engine 13, the approximation curve is formed to be lower, while if the output capability of the engine 13 becomes good with respect to the gripping capability, the approximation curve is formed to be higher.

As described above, with reference to the evaluation value f1, the gripping capability of the motorcycle 1 and the output capability of the engine 13 can be evaluated relative to each other. Regarding the gripping capability, more specifically, design parameters of the motorcycle 1 such as stiffness and weight of the vehicle body, weight of loaded stuff including the driver and the passenger, and the friction coefficient between the front and rear wheels 2 and 3, and the road surface. The evaluation value f1 can be effectively utilized in design support of the motorcycle 1, by referring to the evaluation value f1 in a design process and in a manufacturing process. For example, by designing the engine and the vehicle body so that the evaluation value f is higher, it is possible to achieve a vehicle with a high gripping characteristic, which is less likely to slip. Also, gripping characteristics of vehicles of various kinds can be evaluated relative to each other, using the evaluation value f1. Since the gripping characteristic varies due to a difference in the friction coefficient between the drive wheel and the road surface in the same vehicle body, the friction coefficient of the road surface can be estimated using the evaluation values f1. Since the gripping characteristic varies due to a difference in a normal force, a vehicle body weight including vehicle stuff (difference between one-person riding or two-person riding, presence/absence of loaded stuff) can be estimated using the evaluation value f1.

To drive the evaluation value f1, data of the instant value of the throttle valve opening degree θ which is not less than the predetermined opening degree θA is used, but minute opening degrees near an idling opening degree corresponding to an idling engine speed are excluded. This makes it possible to accurately derive a correlation during driving and improve an evaluation precision. Furthermore, since only the data corresponding to the same transmission gear position G are extracted, it is possible to eliminate a variation in the slip values S with respect to the throttle valve opening degrees θ which could be caused by a difference in the transmission gear position. An evaluation value corresponding to another transmission gear position G can be easily derived by parallel translation in a vertical axis direction of the evaluation value f1 derived using only the data corresponding to a certain transmission gear position G or by multiplying the evaluation value f1 by a predetermined coefficient.

With reference to the evaluation value f1 of this embodiment, an equilibrium point of the generated torque and the frictional force can be evaluated without a need to evaluate the generated torque and the frictional force individually. To derive the evaluation value f1, the angular speed sensor 44, the throttle valve position sensor 45, the transmission gear position sensor 47, and the curve fitting method, which are conventionally used, are utilized. As a result, complexity in the configuration of the system 70 can be lessened.

Embodiment 4

Vehicle Control Utilizing Vehicle Characteristic Evaluation Value

Figure 11:
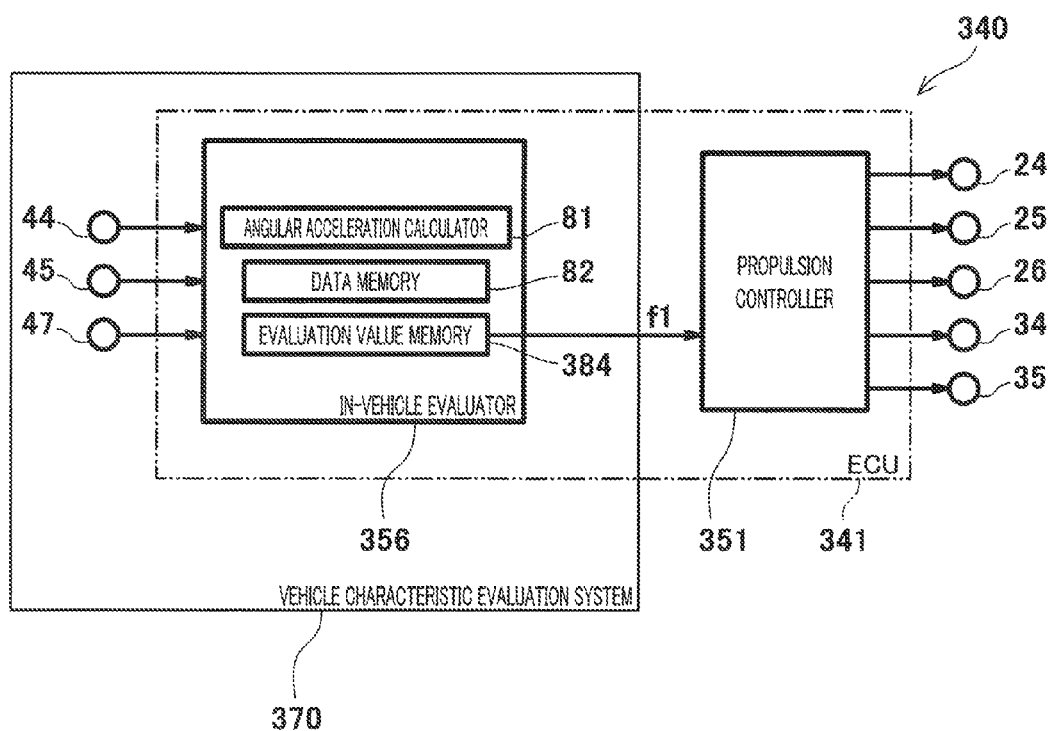
FIG. 11 is a block diagram showing an overall configuration of a control system and a vehicle characteristic evaluation system according to Embodiment 4 of the present invention.

FIG. 11 is a block diagram showing an overall configuration of a control system 340 and a vehicle characteristic evaluation system 370 according to Embodiment 4 of the present invention. Referring to FIG. 11, the control system 340 of this embodiment includes the vehicle characteristic evaluation system 370 in which an evaluation value memory 384 is incorporated into an in-vehicle evaluator 356 in an ECU 341. In the configuration in which the evaluation value memory 384 is incorporated into the in-vehicle evaluator 356 in the ECU 341, the motorcycle 1 can be controlled with reference to the evaluation value f1.

The control system 340 includes a propulsion controller 351 configured to control the motorcycle 1 along with the vehicle characteristic evaluation system 370. The propulsion controller 351 is built into the ECU 341, and is configured to control the valve actuator 24 of the throttle device 16, the fuel feeder 25, the igniter 26, and the brake devices 34 and 35, based on a driving state and the evaluation value f1.

Figure 12:
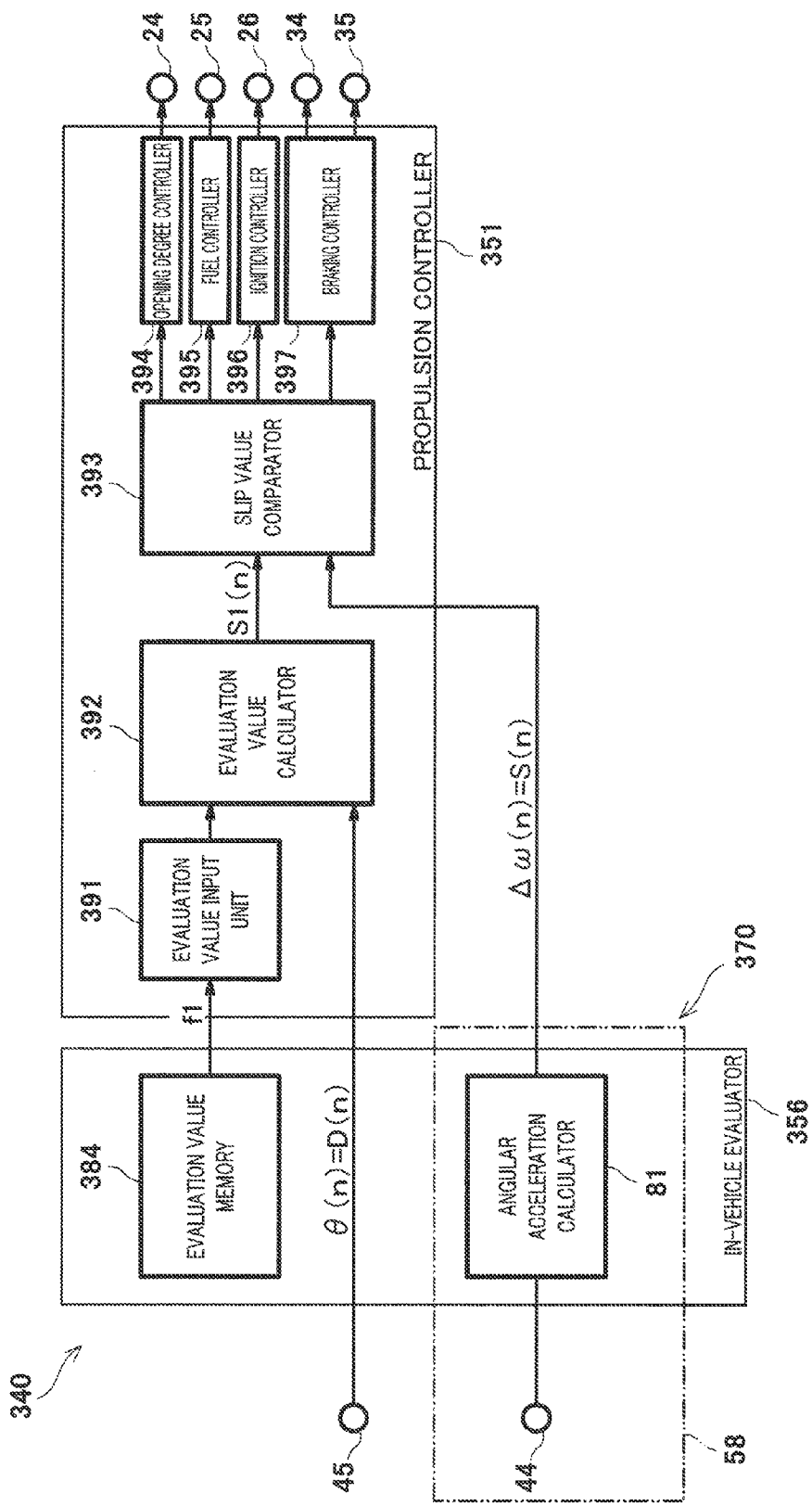
FIG. 12 is a block diagram showing a detailed configuration of a control system of FIG. 11.

FIG. 12 is a block diagram showing a detailed configuration of the control system 340 of this embodiment. Referring to FIG. 12, the propulsion controller 351 includes an evaluation value input unit 391 from which the evaluation value f1 stored in the evaluation value memory 384 is provided as input to a reference value calculator 392, and the reference value calculator 392 configured to calculate a reference value $S1_{(n)}$ of the slip value (in the present example, the angular acceleration Δω of the crankshaft 27) according to the throttle valve opening degree $θ_{(n)}$ (i.e., driving power increase/decrease request value $D_{(n)}$ detected by the throttle valve position sensor 45, by referring to the evaluation value f1. When the evaluation value f1 is expressed as a second-order polynomial in a formula (5), the reference value calculator 392 can calculate the reference value $S1_{(n)}$ according to a formula (6). In formulae (5) and (6), a1 and b1 are coefficients and C1 is a constant term.

$$S = a1 \times \theta 2 + b1 \times \theta + c1 \quad (5)$$

$$S1_{(n)} = a1 \cdot \{D_{(n)}\}2 + b1 \cdot D_{(n)} + c1 \quad (6)$$

The propulsion controller 351 includes a slip value comparator 393 configured to compare the reference value $S1_{(n)}$ of the slip value S calculated by the reference value calculator 392 to the slip value $S_{(n)}$ (hereinafter this value is referred to as a measurement value) measured by the slip value measuring unit 58. The slip value comparator 393 compares the reference value $S1_{(n)}$ to a measurement value $S_{(n)}$ obtained at the same time point that the throttle valve opening degree $θ_{(n)}$ used to obtain the reference value $S1_{(n)}$ is detected.

The propulsion controller 351 includes an opening degree controller 394, a fuel controller 395, an ignition controller 396, and a braking controller 397. The opening degree controller 394, the fuel controller 395, and the ignition controller 396 are configured to find a target value of an opening degree of the sub-throttle valve 23, a target value of a fuel feed amount, a target value of a fuel feed timing, and a target value of an ignition timing, respectively, according to the driving state, and control the valve actuator 24, the fuel feeder 25 and the igniter 26, based on the target values, respectively. The braking controller 397 is configured to control the front and rear brake devices 34 and 35 according to the driving state, and execute a so-called ABS control and a so-called CBS control, through the control of the brake devices 34 and 35.

The slip value comparator 393 is coupled to the opening degree controller 394, the fuel controller 395, the ignition controller 396 and the braking controller 397. If the value obtained by subtracting the reference value $S1_{(n)}$ from the measurement value $S_{(n)}$ is larger than a predetermined positive value, the slip value comparator 393 outputs compensation values for compensating for the respective target values to reduce the driving power transmitted from the rear wheel 3 to the road surface, to the opening degree controller 394, the fuel controller 395, the ignition controller 396, and/or the braking controller 397. In response to the compensation values, the opening degree controller 394 controls the valve actuator 24 to reduce the opening degree of the sub-throttle valve 23, the fuel controller 395 controls the fuel feeder 25 to reduce its fuel feed amount, and the ignition controller 396 controls the igniter 26 to retard its ignition timing. In this way, the torque generated in the engine 13 is suppressed. In addition, the slip value comparator 393 may output a command to the brake controller 397 to brake the rear wheel 3. In response to this command, the braking controller 397 may cause the brake device 35 to operate for a short time. A driving power restricting method is not limited to this, but a control element capable of control may be used.

As should be understood, when the value obtained by subtracting the reference value $S1_{(n)}$ from the measurement value $S_{(n)}$ exceeds a predetermined positive value, the generated torque is likely to be excess and the rear wheel 3 is likely to spin. In this case, the driving power transmitted from the rear wheel 3 to the road surface is suppressed, and thus it is possible to suitably suppress the rear wheel 3 from spinning.

Thus, the control system 340 in the vehicle of Embodiment 4 is configured to decide execution or non-execution of the traction control, the ABS control and the CBS control by utilizing the reference value f. The driving power may be suppressed to a greater degree and a higher braking force may be generated as a deviation between the reference value $S1_{(n)}$ and the measurement value $S_{(n)}$ is larger. As the vehicle control using the measurement value and the reference value, other controls may be used. For example, when the value obtained by subtracting the reference value from the measurement value exceeds a predetermined value, it may be determined that the road surface is a road surface on which the wheel is likely to slip, and starting control or acceleration/deceleration control may be executed based on the determination. On the other hand, when the value obtained by subtracting the reference value from the measurement value is a negative value, there is a chance that the road surface has changed into a road surface such as a circuit, which the wheel easily grips, or a tire has been changed into one which easily grips the road surface. In this case, the driving power may be increased to a greater degree than in a normal case. Instead of deciding execution or non-execution of the traction control or the ABS/CBS control, a traction control amount may be made different or an ABS/CBS control amount may be made different, according to a magnitude of the value obtained by subtraction.

Embodiment 5

Vehicle Control Utilizing Vehicle Characteristic Evaluation Value

Figure 13:
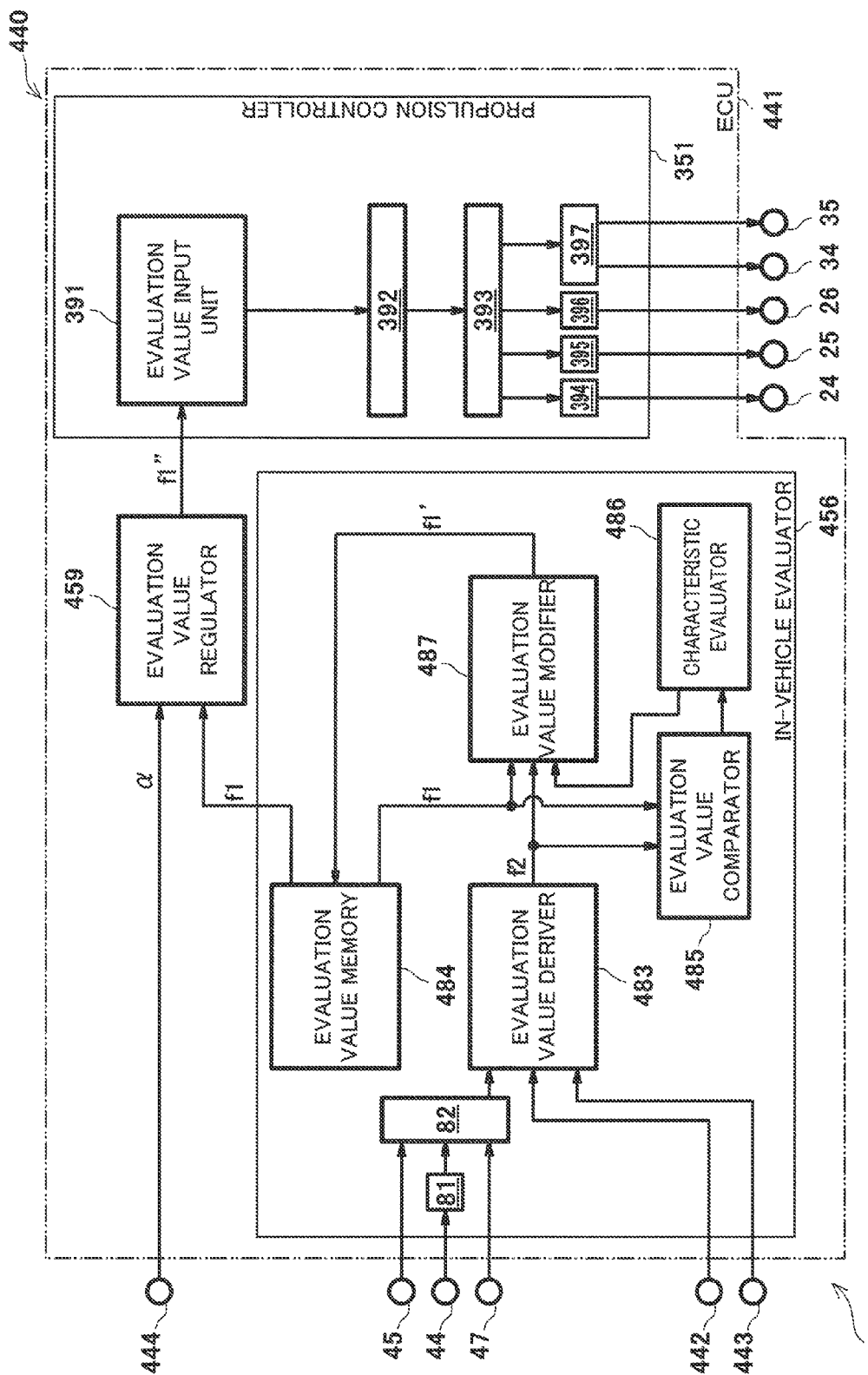
FIG. 13 is a block diagram showing a configuration of a control system according to Embodiment 5 of the present invention.

FIG. 13 is a block diagram showing an overall configuration of a control system 440 and a vehicle characteristic evaluation system 470 according to Embodiment 5 of the present invention. Referring to FIG. 13, in the control system 440 and the vehicle evaluation characteristic system 470, an evaluation value deriver 483 is built into an in-vehicle ECU 441. This makes it possible to derive an evaluation value f2 using data of the motorcycle 1 during driving in a stage at which the user is using the motorcycle 1. In other words, the evaluation value f2 can be derived in the in-vehicle ECU 441 using data obtained at a time point after a time point when data used to derive the evaluation value f1 stored in an evaluation value memory 483 is obtained.

An in-vehicle evaluator 456 in the ECU 441 includes an evaluation value comparator 485 configured to compare the evaluation value f1 stored in the evaluation value memory 484 to the evaluation value f2 derived by the evaluation value deriver 483, and a characteristic evaluator 486 configured to evaluate a vehicle characteristic based on a comparison in the evaluation value comparator 485.

In a case where a passenger is riding the motorcycle 10 along with the driver, a load applied to a tire is large, and therefore the gripping capability improves as compared to a case where the passenger is not riding. The characteristic evaluator 486 is configured to determine presence/absence of the passenger, i.e., evaluate a weight of loaded stuff, by comparing the two evaluation values f1 and f2. In addition, the characteristic evaluator 486 can evaluate a change of an output capability of the engine 13.

The in-vehicle evaluator 456 in the ECU 441 includes an evaluation value modifier 487 configured to modify the evaluation value f1 stored in the evaluation value memory 484 based on the evaluation value f2 derived by the evaluation value evaluator 483 using the data of the motorcycle 1 during driving and derive the modified evaluation value f1'.

Figure 14:
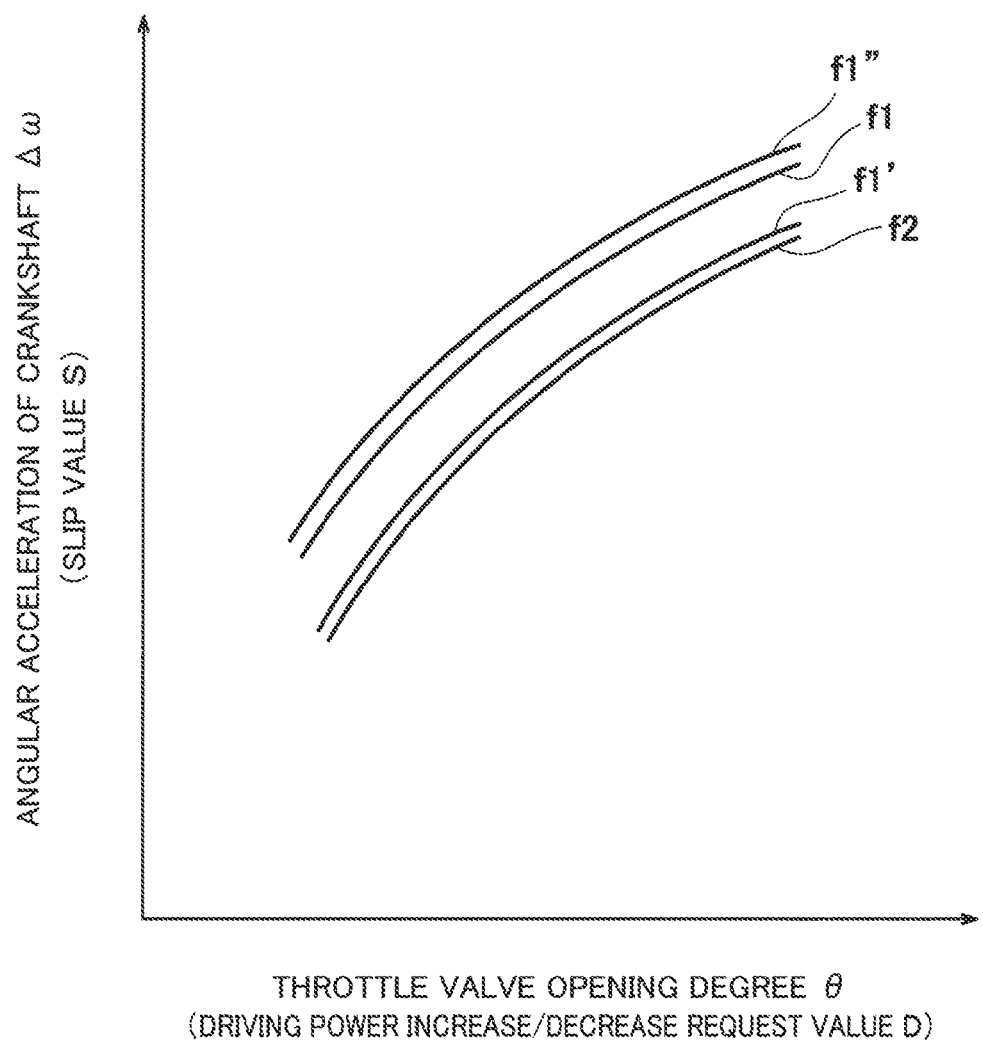
FIG. 14 is a graph showing a characteristic evaluation value stored in an evaluation value memory of FIG. 13, a characteristic evaluation value derived by an evaluation value deriver of FIG. 13, a characteristic evaluation value modified by an evaluation value modifier of FIG. 13, and a characteristic evaluation value regulated by an evaluation value regulator of FIG. 13.

FIG. 13 shows the evaluation value f1 stored in the evaluation value memory 484, the evaluation value f2 derived by the evaluation value evaluator 483, and the evaluation value f1' modified by the evaluation value modifier 487. The evaluation value modifier 487 is configured to modify the evaluation value f1 by, for example, averaging such as arithmetic average or geometric mean. When the evaluation value f1 is given by the above formula (5) and the evaluation value f2 is given by a formula (7), the modified evaluation value f1' is given by a second-order polynomial of a formula (8), and coefficients and constant terms in this polynomial can be calculated by arithmetic average of formulae (9)-(11). A magnitude relationship between weight w1 and weight w2 may be determined as desired. FIG. 14 shows a case where the evaluation value is modified by increasing the weight w2 for the evaluation value f2 derived by the evaluation value deriver 483.

$$S = a2 \times \theta 2 + b2 \times \theta + c2 \tag{7}$$

$$S = a1' \times \theta 2 + b1' \times \theta + c1' \tag{8}$$

$$a1' = (w1 \times a1 + w2 \times a2)/(w1 + w2) \tag{9}$$

$$b1' = (w1 \times b1 + w2 \times b2)/(w1 + w2) \tag{10}$$

$$c1' = (w1 \times c1 + w2 \times c2)/(w1 + w2) \tag{11}$$

Turning back to FIG. 13, the evaluation value f1' modified by the evaluation value modifier 487 replaces the evaluation value f1 which is unmodified and is stored in the evaluation value memory 484. In this way, the evaluation value can be updated based on the latest evaluation value f2 in view of a change in the output capability of the engine 13 which occurs with time, a wear-out of the tire which occurs with time, every individual driver's allowable range of the wheel spin, etc. As a result, the traction control, the ABS control, CBS control, etc, using the above mentioned evaluation value f1 can be executed in view of a change in the output capability of the engine 13, the wear-out of the tire, the driver's preference, etc.

In the formulae (6)-(8), the weight w1 with respect to the evaluation value f1 stored in the evaluation value memory 484 is meant to include zero. In other words, the evaluation value f2 derived by the evaluation value deriver 483 may be stored in the evaluation value memory 484 without weighting.

The timing when the evaluation value deriver 483 derives the evaluation value f2, the timing when the evaluation value modifier 487 modifies the evaluation value f1, and the timing when updating of the evaluation value f1 stored in the evaluation value memory 484 starts are not particularly limited. For example, they may start at a time point when an ignition switch 442 of the motorcycle 1 is turned ON, at a time point when a dedicated command switch 443 is turned ON, or in every predetermined cycle (e.g., every ten minutes) during driving of the motorcycle 1.

The evaluation value modifier 487 may start modifying the evaluation value f1 if the vehicle characteristic evaluator 486 determines that a difference between the two evaluation values f1 and f2 is beyond a predetermined allowable range, based on a comparison result of the evaluation values f1 and f2 in the evaluation value comparator 485. This makes it possible to promptly change the evaluation value f1 stored in an evaluation value memory 484, according to a change in the vehicle characteristic such as the weight of loaded stuff or the output capability of the engine 13. As a result, the motorcycle 1 can be controlled according to the characteristic change with reference to the changed evaluation value.

Furthermore, in this embodiment, the ECU 441 includes an evaluation value regulator 459 configured to regulate the evaluation value f1 stored in the evaluation value memory 484, and a regulation command switch 444 with which the driver enters a command for regulating the evaluation value f1 is coupled to the ECU 441. The evaluation value regulator 459 intervenes between the evaluation value memory 484 and the evaluation value input unit 391. The evaluation value regulator 459 is configured to regulate the evaluation value f1 stored in the evaluation value memory 484 according to a value α provided as input with the regulation command switch 444 and output the regulated evaluation value f1" to the evaluation value input unit 391. When the evaluation value f1 is given by the formula (5), the regulated evaluation value f1" is given by a formula (12) using the input value α.

$$f1''=a1\times\theta2+b1\times\theta+(c1+\alpha) \quad (8)$$

FIG. 14 also shows the evaluation value f1" regulated by the evaluation value regulator 459. Referring to FIG. 14, the driver can enter a positive input value α, for parallel-translating the evaluation value f1 in an upward direction, with the regulation command switch 444. By doing so, a reference value of a slip value is calculated with reference to the evaluation value f1" provided as input to the evaluation value input unit 391 such that the reference value is regulated to be larger. As a result, the driver can enlarge an allowable range of the wheel spin according to the driver's driving ability and steer the motorcycle 1 while permitting a little wheel spin.

Other Embodiment

The above embodiments may be suitably changed within a scope of the present invention. The motorcycle is a straddle-type vehicle and turns in a tilted attitude. In this kind of vehicle, a bank angle during driving may be sequentially detected instead of the driving power increase/decrease request value, and then a relationship in driving indicating a correlation between the bank angle and the slip value may be derived as the evaluation value. In this case, the horizontal axis in each of FIGS. 10 and 11 indicates the bank angle. The evaluation value is derived in the same manner that the evaluation values shown in FIGS. 10 and 11 are derived. The gripping capability of the vehicle changes according to a change in the bank angle. By referring to the evaluation value derived as described above, the gripping capability of the vehicle corresponding to the bank angle can be evaluated.

Although the evaluation value is derived by curve fitting, any configuration may be used, so long as features of the data are suitably represented as shown in FIG. 10, and a control map table may be created using the data stored in the data memory. Although the four-cycle engine is used as the driving power source in the vehicle, other driving power sources capable of outputting a driving power may be used. For example, the driving power source may be an electric motor, or a so-called hybrid driving power source including a combination of the engine and the electric motor. The vehicle is not limited to the motorcycle but may be other vehicles such as all terrain vehicles. The above advantages are achieved when the present invention is applied to a straddle-type vehicle which is relatively lightweight and tends to change the gripping capability according to a weight of loaded stuff. Moreover, the present invention is suitably used in a bankable vehicle, which is a vehicle such as a motorcycle which is configured to turn by tilting the vehicle body in a tilted attitude toward an inside of a turn, for example on a flat surface, and tends to change its gripping capability during driving.

The road surface condition determination unit in Embodiment 1 or 2 and the in-vehicle evaluator in one of Embodiment 3-5 may be built into a single ECU. In this case, the motorcycle 1 can be controlled based on both of the road surface condition and the evaluation value.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A control system in a straddle-type vehicle configured to rotate a drive wheel by a driving power generated in a driving power source mounted in the vehicle, comprising:
    a slip value measuring unit configured to measure a slip value indicating an extent to which the drive wheel spins by:
        detecting a first value which is a rotational speed of a drive wheel;
        detecting a second value which is a rotational speed of a driven wheel or a vehicle speed; and
        obtaining the slip value using a subtraction value derived by subtracting the second value from the first value;
    a change rate calculator configured to calculate a change rate of the slip value measured by the slip value measuring unit, the change rate being a change rate of the slip value per unit time;
    a road surface condition determiner configured to determine a road surface condition according to the change rate of the slip value calculated by the change rate calculator, wherein the road surface condition determiner is configured to determine that a friction coefficient of the road surface condition decreases as the change rate increases, the friction coefficient of the road surface condition increases as the change rate decreases, and to decide an output value indicating the road surface condition based on a plurality of instant values indicating the road surface condition which are obtained at different time points; and
    wherein the road surface condition determiner chooses as the output value, a road surface condition selected from a plurality of predetermined road surface conditions, based upon a maximum value of the change rate of the slip value obtained within a predetermined time period back from a time point when a latest value indicating a latest result of the determination of the road surface condition is obtained.

2. A method of controlling a vehicle configured to rotate a drive wheel by a driving power generated in a driving power source mounted in the vehicle, comprising:
    measuring a slip value indicating an extent to which the drive wheel spins;
    calculating, with an electronic control unit (ECU), a plurality of change rates sequentially obtained at predetermined time points, wherein each of the change rates is a change rate of the slip value measured in the step of measuring the slip value, the change rate being a change rate of the slip value per unit time;
    determining, with the ECU, that a friction coefficient of a road surface condition decreases as the change rates increase, and a friction coefficient of the road surface condition increases as the change rates decrease;
    deciding, with the ECU, an output value indicating the road surface condition based on a plurality of instance values indicating the road surface condition, which are obtained at different time points,
    controlling, with the ECU, the vehicle based on the output value of the road surface condition; and
    wherein deciding, with the ECU, the output value includes choosing as the output value a road surface condition obtained at a time point when the change rate is a maximum value of road surface conditions which are obtained within a predetermined time period back from a time point when a latest value indicating a latest result of the determination of the road surface condition is obtained.

3. The method of controlling the vehicle according to claim 2, further comprising outputting the output value to an instrument panel.

4. The method of controlling the vehicle according to claim 2, further comprising storing a result of the determination of the road surface condition such that the result is associated with a driving state or an engine state.

5. The method of controlling the vehicle according to claim 2, further comprising transmitting a result of the determination of the road surface condition to the vehicle via radio waves.

6. The method of controlling the vehicle according to claim 2, wherein determining, with the ECU, includes determining the road surface condition when the vehicle is starting.

7. The method of controlling the vehicle according to claim 2, further comprising detecting, with the ECU, a change in a tire or a number of persons straddling the vehicle based on a result of the determination of the road surface condition.

8. The method of controlling the vehicle according to claim 1,
wherein the deciding, with the ECU, the output value includes deciding the output value by excluding a road surface condition obtained for a stop period of the vehicle.

9. The method of controlling the vehicle according to claim 2,
wherein the vehicle is a motorcycle.

* * * * *